(12) United States Patent
Tatsuta et al.

(10) Patent No.: US 12,201,901 B2
(45) Date of Patent: Jan. 21, 2025

(54) INFORMATION PROCESSING SYSTEM, COMPUTER-READABLE NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

(71) Applicant: NINTENDO CO., LTD., Kyoto (JP)

(72) Inventors: Hideyuki Tatsuta, Kyoto (JP); Takafumi Masaoka, Kyoto (JP); Kazuhiro Yoshikawa, Kyoto (JP); Ryosuke Suzuki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 222 days.

(21) Appl. No.: 17/941,397

(22) Filed: Sep. 9, 2022

(65) Prior Publication Data
US 2023/0249068 A1 Aug. 10, 2023

(30) Foreign Application Priority Data
Feb. 8, 2022 (JP) ................. 2022-018213

(51) Int. Cl.
*A63F 13/428* (2014.01)
*A63F 13/211* (2014.01)
(Continued)

(52) U.S. Cl.
CPC .......... *A63F 13/428* (2014.09); *A63F 13/211* (2014.09); *A63F 13/44* (2014.09); *A63F 13/812* (2014.09)

(58) Field of Classification Search
None
See application file for complete search history.

(56) References Cited

U.S. PATENT DOCUMENTS

| | | | | |
|---|---|---|---|---|
| 7,424,388 B2 * | 9/2008 | Sato | ...................... | A63F 13/211 |
| | | | | 463/31 |
| 7,658,676 B2 * | 2/2010 | Ohta | ...................... | A63F 13/428 |
| | | | | 345/158 |

(Continued)

FOREIGN PATENT DOCUMENTS

| | | |
|---|---|---|
| JP | 2008-173345 | 7/2008 |
| JP | 2010-237882 | 10/2010 |

(Continued)

OTHER PUBLICATIONS

Apr. 5, 2023 Search Report issued in European Patent Application No. 22215612.7, pp. 1-5.

*Primary Examiner* — Seng H Lim
(74) *Attorney, Agent, or Firm* — Nixon & Vanderhye P.C.

(57) ABSTRACT

During execution of a game, first-type processing is executed if it is determined that an input device has been moved in a first direction at a timing when a predetermined condition is satisfied during execution of the game, on the basis of operation data including at least data based on an output of an inertial sensor. In a case where, on the basis of the operation data, it is determined that the input device has been moved in a second direction at a timing when the predetermined condition is satisfied, if it is further determined that the input device has been moved in the first direction during a predetermined suspension period, the first-type processing is executed. If it is determined that the input device has not been moved in the first direction during the predetermined suspension period, second-type processing is executed after the predetermined suspension period has elapsed.

20 Claims, 16 Drawing Sheets

(51) Int. Cl.
*A63F 13/44* (2014.01)
*A63F 13/812* (2014.01)

(56) References Cited

U.S. PATENT DOCUMENTS

| | | | | |
|---|---|---|---|---|
| 7,854,656 | B2* | 12/2010 | Sato | A63F 13/57 463/3 |
| 7,872,638 | B2* | 1/2011 | Sato | G06T 13/00 463/36 |
| 8,182,343 | B2* | 5/2012 | Izuno | A63F 13/812 463/43 |
| 8,216,070 | B2* | 7/2012 | Okamura | G06F 3/0325 345/157 |
| 8,454,439 | B2* | 6/2013 | Otani | A63F 13/428 463/7 |
| 9,501,158 | B2* | 11/2016 | Okamura | A63F 13/211 |
| 11,285,394 | B1* | 3/2022 | Yamada | A63F 13/56 |
| 2007/0211025 | A1* | 9/2007 | Sato | G06F 3/0346 345/158 |
| 2007/0213109 | A1* | 9/2007 | Sato | A63F 13/211 463/3 |
| 2007/0213127 | A1* | 9/2007 | Sato | A63F 13/428 463/31 |
| 2008/0177497 | A1 | 7/2008 | Ohta | |
| 2009/0209344 | A1* | 8/2009 | Okamura | G06F 3/0346 463/36 |
| 2010/0178988 | A1* | 7/2010 | Izuno | A63F 13/812 463/43 |
| 2010/0245365 | A1* | 9/2010 | Hato | A63F 13/577 345/473 |
| 2011/0065488 | A1* | 3/2011 | Okamura | A63F 13/428 463/43 |
| 2013/0005496 | A1* | 1/2013 | Priester | A63B 71/06 473/409 |
| 2015/0261318 | A1 | 9/2015 | Scavezze et al. | |
| 2016/0041620 | A1 | 2/2016 | Motoyama et al. | |
| 2021/0038973 | A1 | 2/2021 | Wada et al. | |

FOREIGN PATENT DOCUMENTS

| | | |
|---|---|---|
| JP | 2016-038905 | 3/2016 |
| JP | 2021-23667 | 2/2021 |

* cited by examiner

F I G. 8
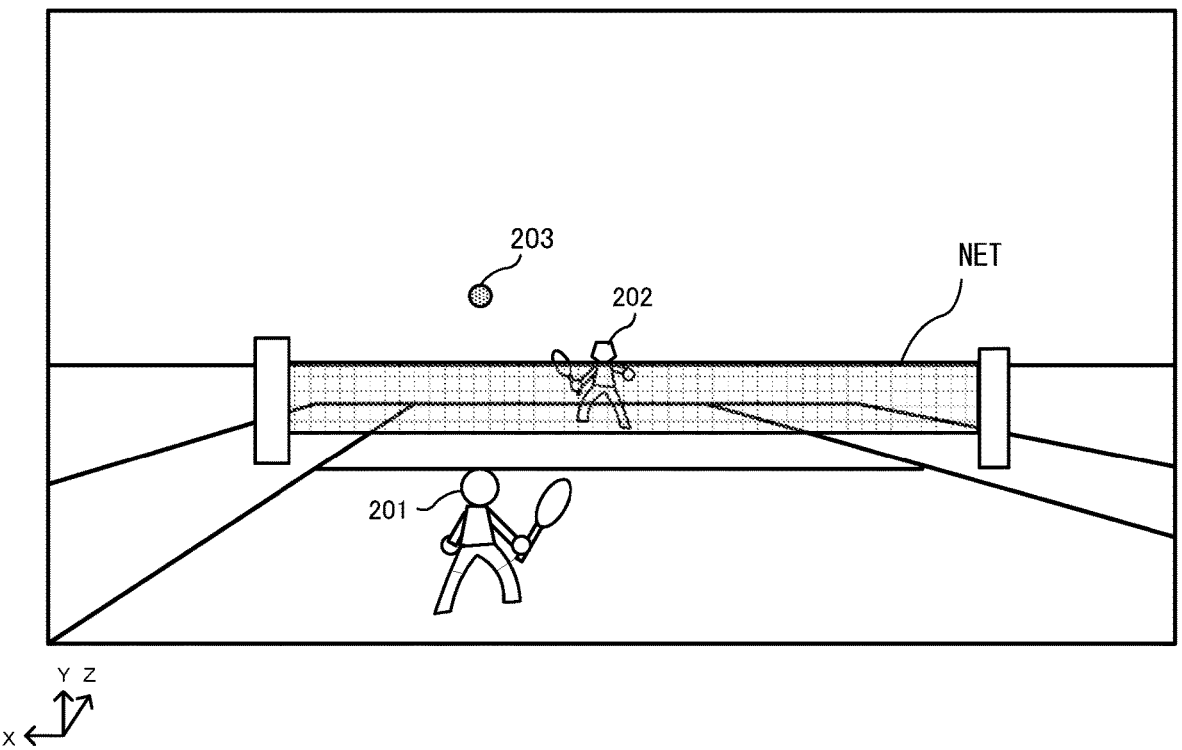

INFORMATION PROCESSING SYSTEM, COMPUTER-READABLE NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

CROSS REFERENCE TO RELATED APPLICATION

This application claims priority to Japanese Patent Application No. 2022-018213 filed on Feb. 8, 2022, the entire contents of which are incorporated herein by reference.

FIELD

The present disclosure relates to game processing using an input device having an inertial sensor.

BACKGROUND AND SUMMARY

Conventionally, there has been known game processing for a game in which an input is performed using an inertial sensor, the game processing allowing the game to be advanced when an input is performed toward a correct-answer direction set in advance.

In the above game, a threshold is adjusted so that a direction input toward the correct-answer direction can be easily determined, thereby preventing a player's unintentional operation from being reflected in the game processing.

In this regard, depending on the content of the game processing, there is room for using a more appropriate method so as to prevent a player's unintentional operation from being reflected in the game processing.

Accordingly, an object of the present disclosure is to provide an information processing system, a computer-readable non-transitory storage medium having an information processing program stored therein, an information processing apparatus, and an information processing method that can prevent a player's unintentional operation from being reflected in game processing.

Configuration examples for achieving the above object will be shown below.

One configuration example is a sport game system including an operation device and an information processing apparatus having a processor. The information processing apparatus is configured to execute the following processing. First, a game is executed. Operation data including at least data based on an output of the inertial sensor is acquired. If, on the basis of the operation data, it is determined that the input device has been moved in a first direction at a timing when a predetermined condition is satisfied during execution of the game, first-type processing in the game is executed. In a case where, on the basis of the operation data, it is determined that the input device has been moved in a second direction at a timing when the predetermined condition is satisfied, if it is further determined that the input device has been moved in the first direction during a predetermined suspension period, the first-type processing is executed. On the other hand, if it is further determined that the input device has not been moved in the first direction during the predetermined suspension period, second-type processing in the game is executed after the predetermined suspension period has elapsed.

According to the above configuration example, if it is determined that the input device has been moved in the second direction instead of the first direction, then the suspension period is provided, to give a player an opportunity for redetermination about a motion toward the first direction. Then, if the input device is moved in the first direction during the suspension period, the first-type processing corresponding to the first direction is executed. Thus, when the input device is moved by the player who intends to move the input device in the first direction, even if a motion of the input device toward the second direction which is a direction not intended by the player is detected through the motion process, an opportunity for performing redetermination about a motion toward the first direction is given. As a result, a motion toward the first direction can be detected and this can be reflected in the game processing.

In another configuration example, the information processing apparatus may be further configured to, if it is determined that the input device has been moved in the first direction during the predetermined suspension period, execute the first-type processing before the predetermined suspension period elapses.

According to the above configuration example, when an input toward the first direction is detected during the suspension period, the first-type processing can be executed immediately. This can reduce a possibility of letting the player feel a lag of response to the own operation.

In another configuration example, the first-type processing in the game may be processing for advancing the game so as to be more advantageous to a player who plays the game, than the second-type processing in the game.

According to the above configuration example, it is possible to make a condition in which processing advantageous to the player is readily executed.

In another configuration example, the information processing apparatus may be further configured to: execute processing relevant to a predetermined game event in the game; and on the basis of a content of the predetermined game event, set a first determination condition for determining that the input device has been moved in the first direction, and a second determination condition for determining that the input device has been moved in the second direction.

According to the above configuration example, it is possible to dynamically change the direction to be determined as the first direction and the direction to be determined as the second direction, on a game event basis. Thus, direction setting in accordance with game development can be achieved, whereby amusement of the game can be improved.

In another configuration example, the information processing apparatus may be further configured to: execute processing of moving a moving object in the virtual space, in the game; and set the first determination condition and the second determination condition on the basis of a position of a player object placed in the virtual space and a position of the moving object.

According to the above configuration example, since the first determination condition and the second determination condition are set on the basis of the positional relationship between the player object and the moving object, it is possible to set such determination conditions as not to give a feeling of strangeness to the player between their positional relationship and the content of each determination condition.

In another configuration example, the information processing apparatus may be further configured to move the player object toward a player movement destination position calculated on the basis of a movement direction of the moving object, in the game.

According to the above configuration example, it is possible to create a situation in which the player can readily concentrate on an operation of moving the input device.

In another configuration example, the information processing apparatus may be further configured to set the first determination condition and the second determination condition on the basis of the player movement destination position calculated on the basis of the movement direction of the moving object, in the game.

According to the above configuration example, regarding setting of the first determination condition and the second determination condition, it is possible to set such conditions as not to give a feeling of strangeness in light of the positional relationship between the moving object and the player object.

In another configuration example, if it is determined that the input device has been moved in the first direction, processing of causing the player object to perform a first action with respect to the moving object may be executed as the first-type processing, and if it is determined that the input device has been moved in the second direction, processing of causing the player object to perform a second action different from the first action may be executed as the second-type processing.

According to the above configuration example, it is possible to cause the player object to perform actions different between the first direction and the second direction.

In another configuration example, the first-type processing in the game may be executed on the basis of an orientation of the input device in a determination period including at least a timing when the predetermined condition is satisfied, the orientation being calculated on the basis of the acquired operation data.

According to the above configuration example, it is possible to change the content of the first-type processing on the basis of the orientation of the input device, whereby amusement of the game can be improved.

According to the exemplary embodiments, even if the player has performed an unintentional operation, an opportunity for allowing correction can be given to the player, whereby usability can be improved.

BRIEF DESCRIPTION OF THE DRAWINGS

FIG. 8 shows a non-limiting example of a game screen according to the exemplary embodiment;

DETAILED DESCRIPTION OF NON-LIMITING EXAMPLE EMBODIMENTS

Hereinafter, one exemplary embodiment will be described.

A game system according to an example of the exemplary embodiment will be described below. An example of a game system 1 according to the exemplary embodiment includes a main body apparatus (an information processing apparatus, which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment will be described, and then, the control of the game system 1 according to the exemplary embodiment will be described.

Figure 1:
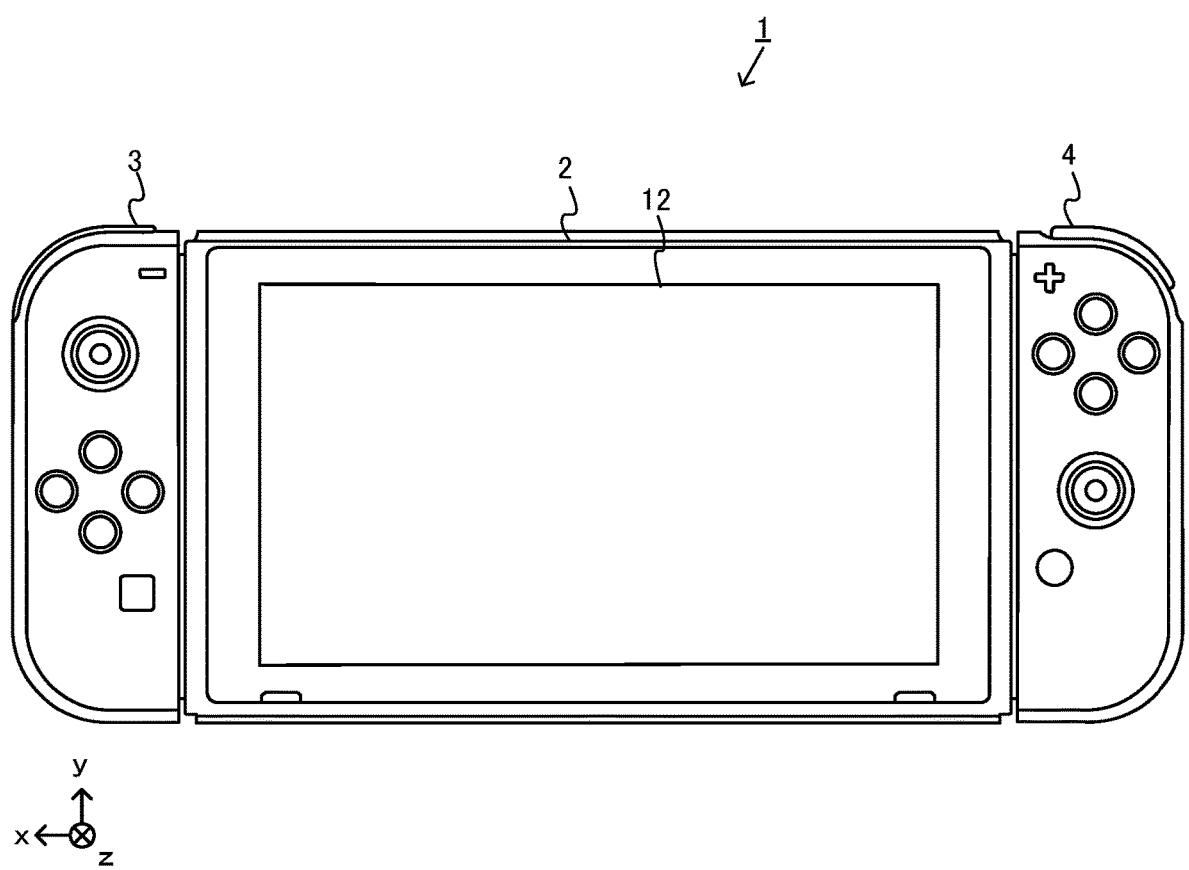
FIG. 1 shows a non-limiting example of a state in which a left controller 3 and a right controller 4 are attached to a main body apparatus 2.

FIG. 1 shows an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
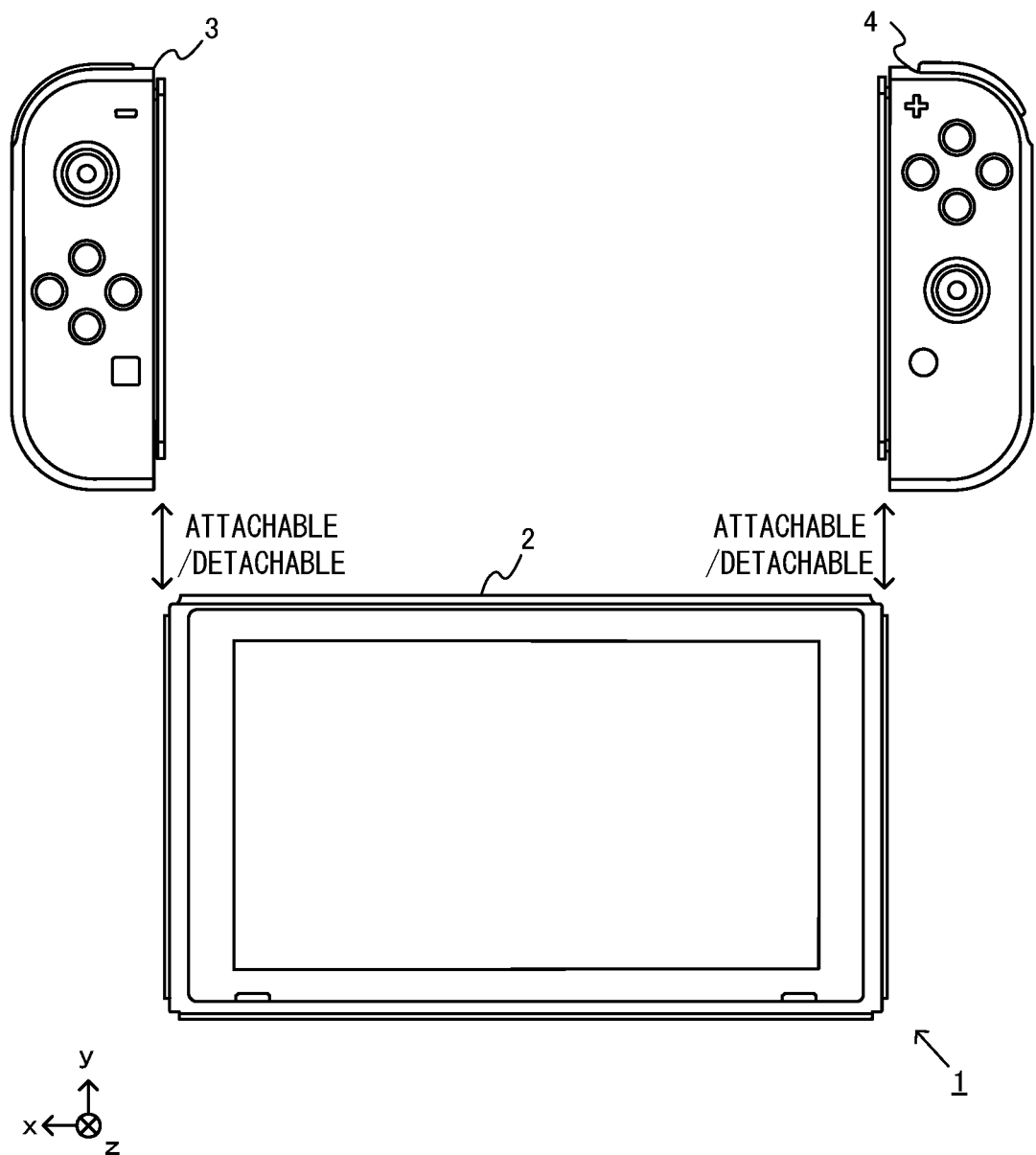
FIG. 2 shows a non-limiting example of a state in which the left controller 3 and the right controller 4 are detached from the main body apparatus 2.

FIG. 2 shows an example of the state where each of the left controller 3 and the right controller 4 is detached from the main body apparatus 2. As shown in FIGS. 1 and 2, the left controller 3 and the right controller 4 are attachable to and detachable from the main body apparatus 2. Hereinafter, the left controller 3 and the right controller 4 may be collectively referred to as "controller".

Figure 3:
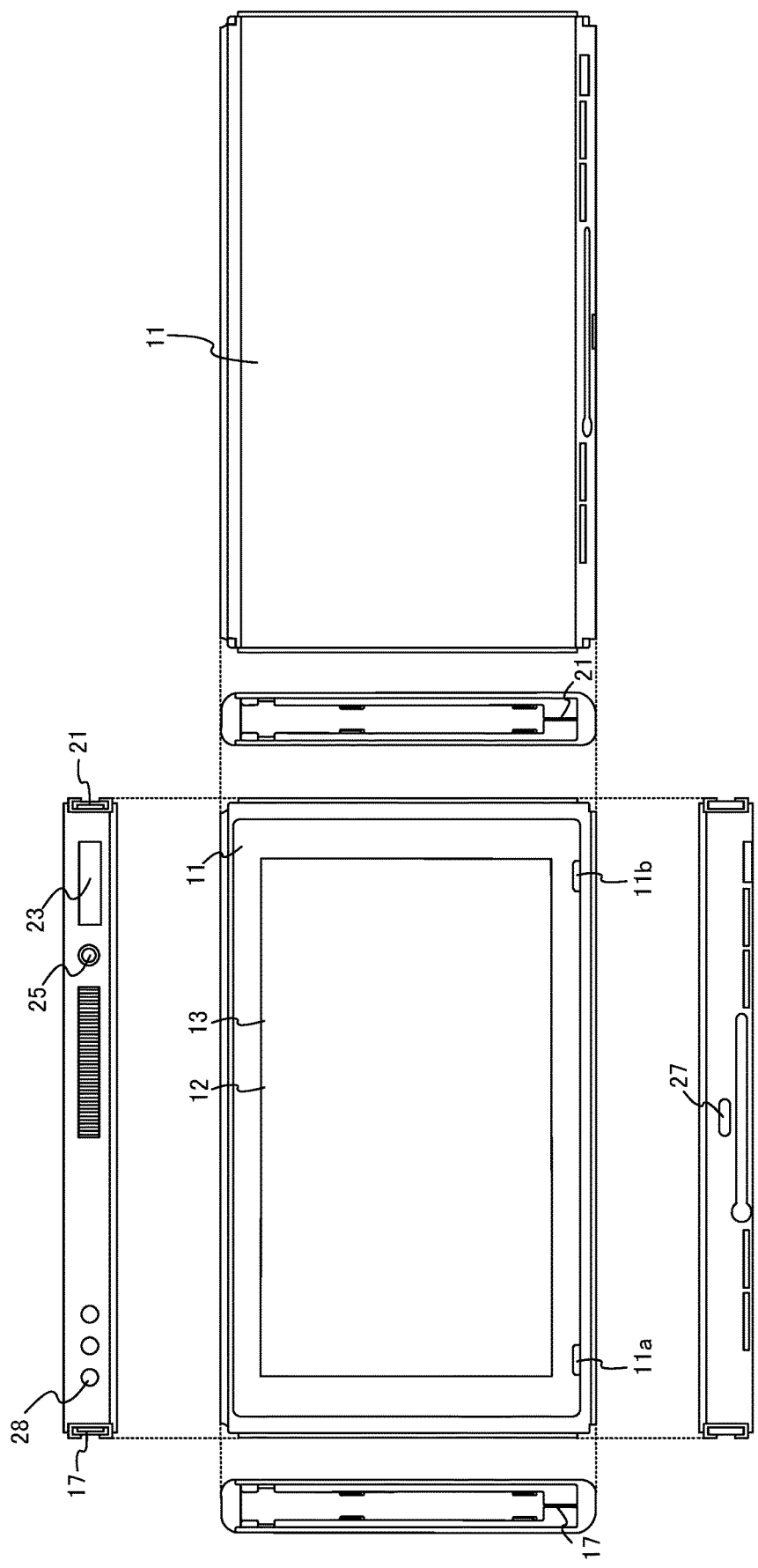
FIG. 3 is six orthogonal views showing a non-limiting example of the main body apparatus 2.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a substantially rectangular shape.

The shape and the size of the housing 11 are discretionary. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

The main body apparatus 2 includes a touch panel 13 on the screen of the display 12. In the exemplary embodiment, the touch panel 13 is of a type capable of receiving a multi-touch input (e.g., electrical capacitance type). However, the touch panel 13 may be of any type, and may be, for example, of a type capable of receiving a single-touch input (e.g., resistive film type).

The main body apparatus 2 includes speakers (i.e., speakers 88 shown in FIG. 6) within the housing 11. As shown in FIG. 3, speaker holes 11a and 11b are formed in the main surface of the housing 11. Then, sounds outputted from the speakers 88 are outputted through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided at an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and outputted from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
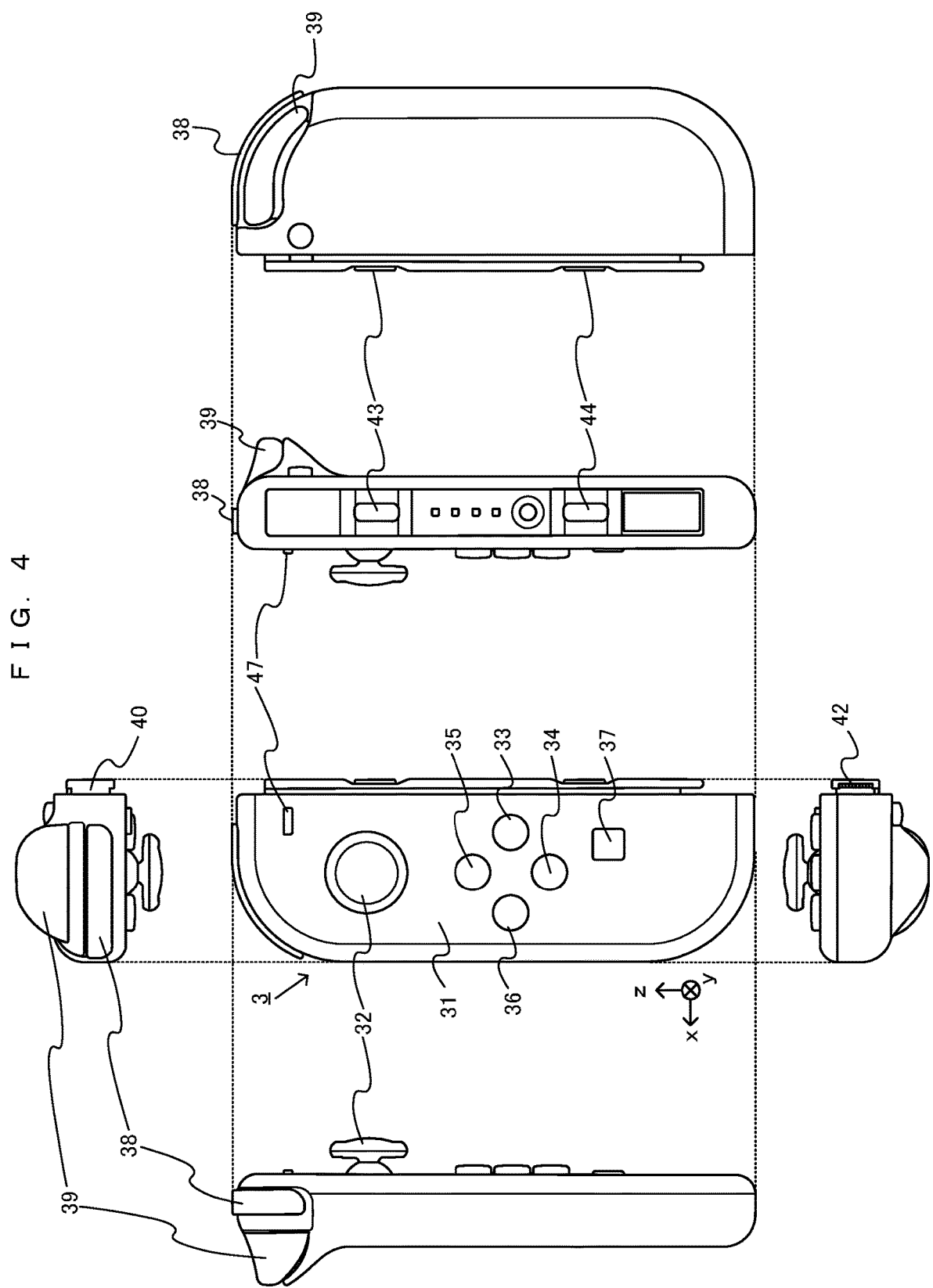
FIG. 4 is six orthogonal views showing a non-limiting example of the left controller 3.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction shown in FIG. 4 (i.e., a z-axis direction shown in FIG. 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly, the left hand. Further, the left controller 3 can also be held in the orientation in which the left controller 3 is horizontally long. When held in the orientation in which the left controller 3 is horizontally long, the left controller 3 may be held with both hands.

The left controller 3 includes a left analog stick (hereinafter, referred to as a "left stick") 32 as an example of a direction input device. As shown in FIG. 4, the left stick 32 is provided on a main surface of the housing 31. The left stick 32 can be used as a direction input section with which a direction can be inputted. The user tilts the left stick 32 and thereby can input a direction corresponding to the direction of the tilt (and input a magnitude corresponding to the angle of the tilt). The left controller 3 may include a directional pad, a slide stick that allows a slide input, or the like as the direction input section, instead of the analog stick. Further, in the exemplary embodiment, it is possible to provide an input by pressing the left stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
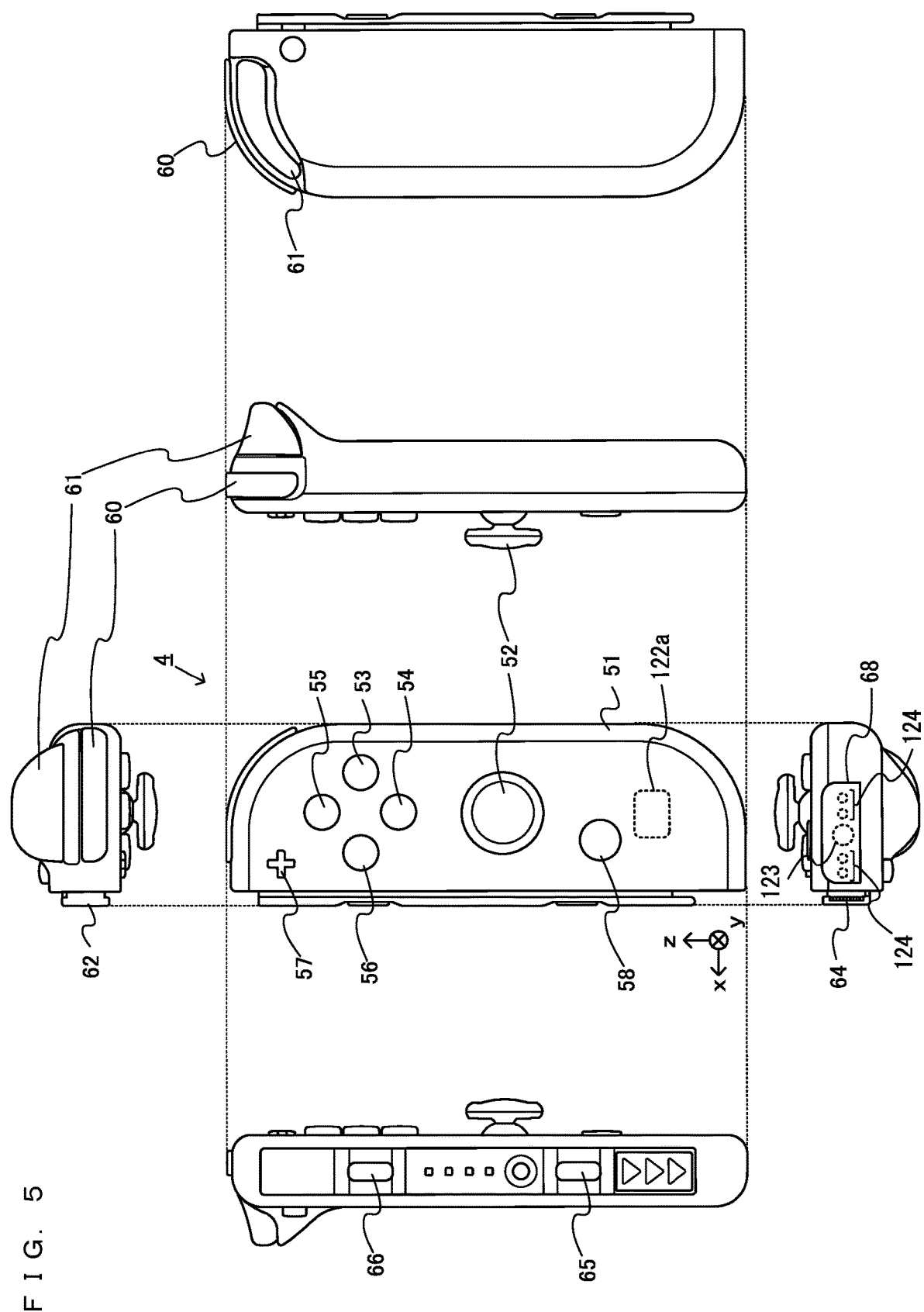
FIG. 5 is six orthogonal views showing a non-limiting example of the right controller 4.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction shown in FIG. 5 (i.e., the z-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes a right analog stick (hereinafter, referred to as a "right stick") 52 as a direction input section. In the exemplary embodiment, the right stick 52 has the same configuration as that of the left stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
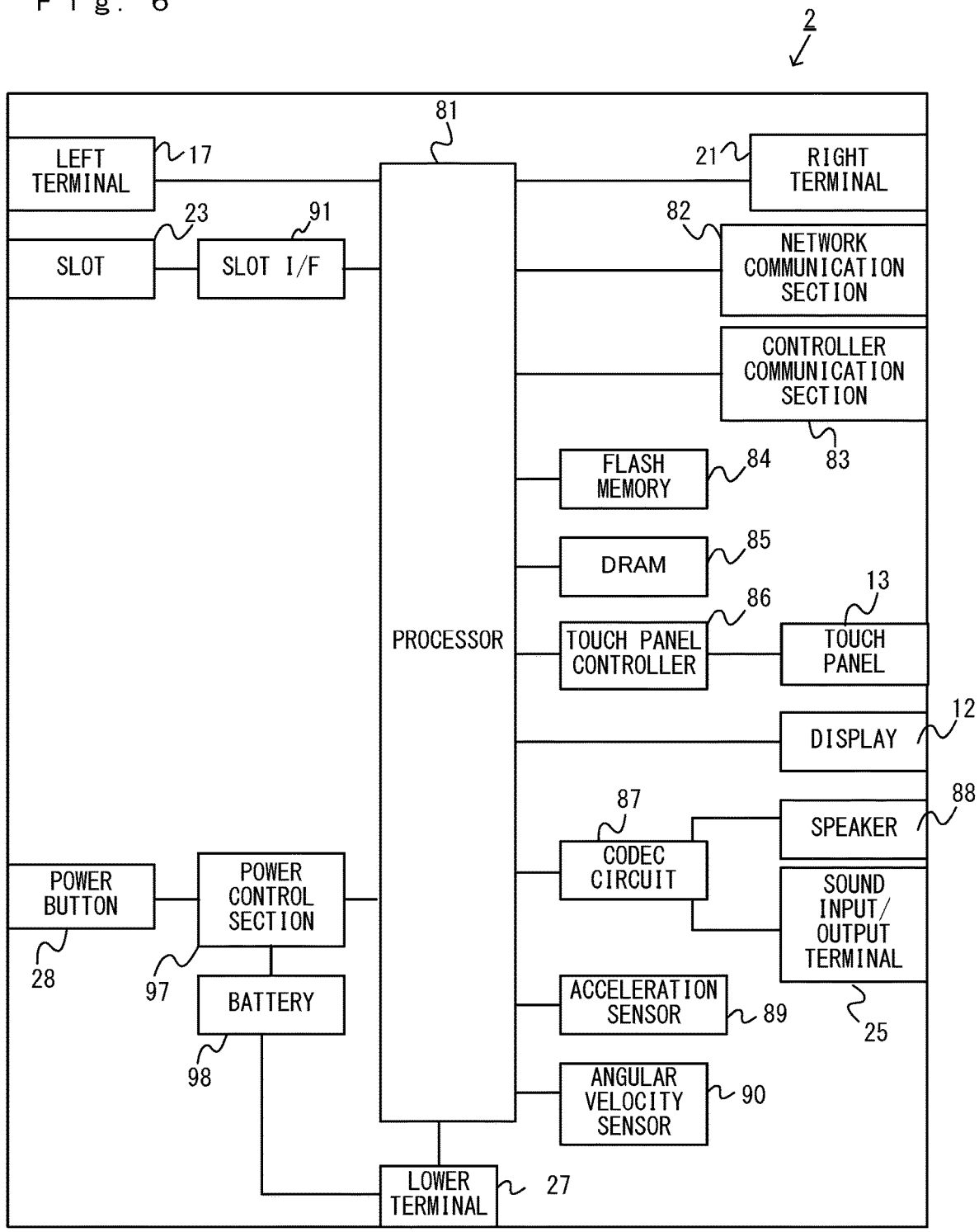
FIG. 6 is a block diagram showing a non-limiting example of the internal configuration of the main body apparatus 2.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and housed in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes the flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter, abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined method for communication (e.g., communication based on a unique protocol or infrared light communication). The wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2, and the left controller 3 and the right controller 4, is discretionary. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. On the basis of a signal from the touch panel 13, the touch panel controller 86 generates data indicating the position at which a touch input has been performed, for example, and outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). On the basis of a command from the processor 81, the power control section 97 controls the supply of power from the battery 98 to the above components.

Further, the battery 98 is connected to the lower terminal 27. When an external charging device (e.g., the cradle) is connected to the lower terminal 27 and power is supplied to the main body apparatus 2 via the lower terminal 27, the battery 98 is charged with the supplied power.

Figure 7:
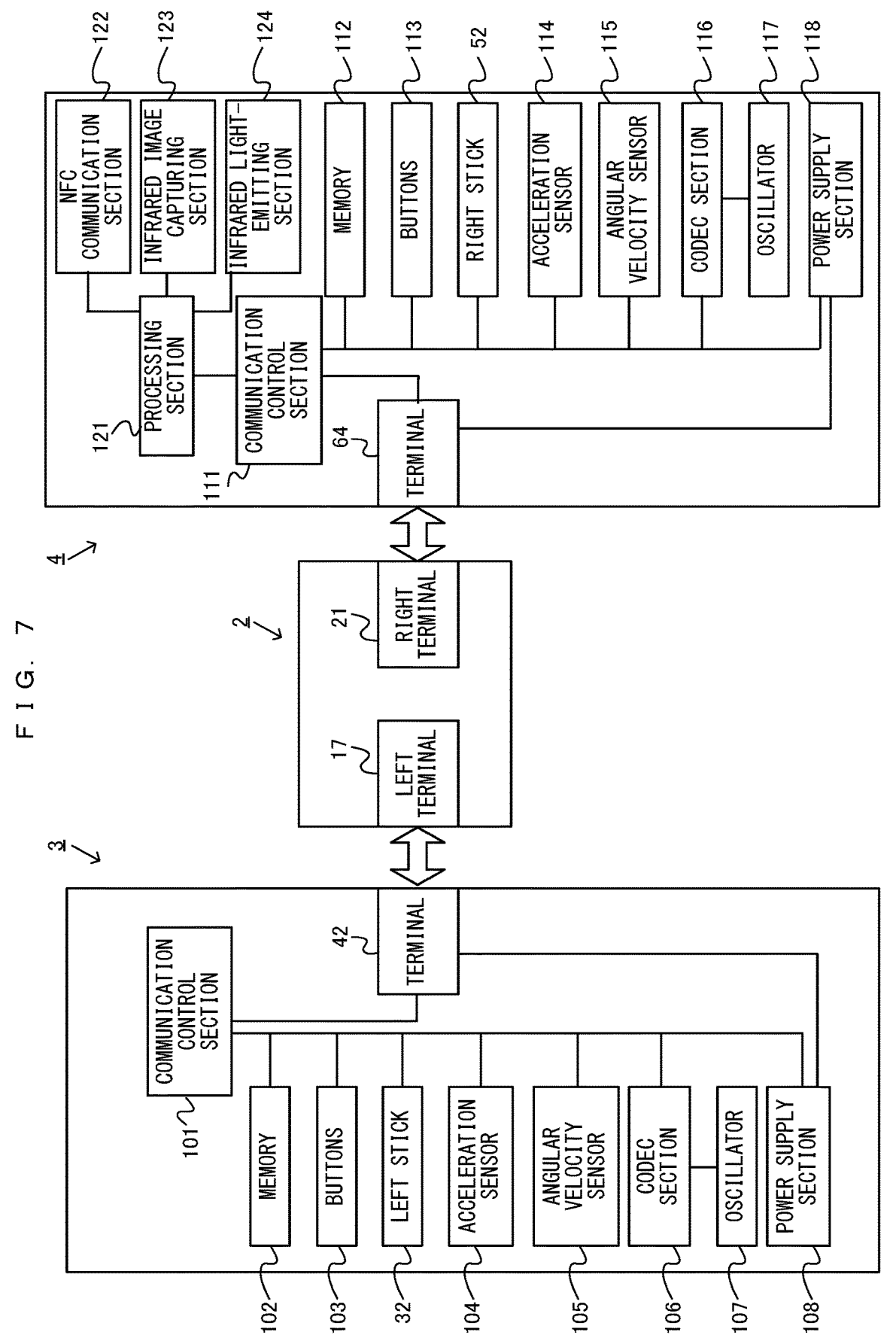
FIG. 7 is a block diagram showing non-limiting examples of the internal configurations of the main body apparatus 2, the left controller 3, and the right controller 4.

FIG. 7 is a block diagram showing examples of the internal configurations of the main body apparatus 2, the left controller 3, and the right controller 4. The details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the left stick 32. Each of the buttons 103 and the left stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., x, y, z axes shown in FIG. 4) directions. The acceleration sensor 104 may detect an acceleration along one axial direction or accelerations along two axial directions. In the exemplary embodiment, the angular velocity sensor 105 detects angular velocities about predetermined three axes (e.g., the x, y, z axes shown in FIG. 4). The angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are outputted to the communication control section 101 repeatedly at appropriate timings.

The communication control section 101 acquires information regarding an input (specifically, information regarding an operation or the detection result of the sensor) from each of input sections (specifically, the buttons 103, the left stick 32, and the sensors 104 and 105). The communication control section 101 transmits operation data including the acquired information (or information obtained by performing predetermined processing on the acquired information) to the main body apparatus 2. The operation data is transmitted repeatedly, once every predetermined time. The interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the left stick 32 on the basis of the operation data. Further, the main body apparatus 2 can calculate information regarding the motion and/or the orientation of the left controller 3 on the basis of the operation data (specifically, the detection results of the acceleration sensor 104 and the angular velocity sensor 105).

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the right stick 52, and inertial sensors (an acceleration sensor 114 and an angular velocity sensor 115). These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[Outline of Game Processing in Exemplary Embodiment]

Next, the outline of operation of the game processing executed by the game system 1 according to the exemplary embodiment will be described. As described above, in the game system 1, the main body apparatus 2 is configured such that each of the left controller 3 and the right controller 4 is attachable thereto and detachable therefrom. In a case of playing the game with the left controller 3 and the right controller 4 attached to the main body apparatus 2, a game image is outputted to the display 12. In a case where the main body apparatus 2 alone with the left controller 3 and the right controller 4 detached therefrom is mounted on the cradle, the main body apparatus 2 can output a game image to a stationary monitor or the like via the cradle. In the exemplary embodiment, the case of playing the game in the latter manner will be described as an example. Specifically, the main body apparatus 2 alone with the left controller 3 and the right controller 4 detached therefrom is mounted on the cradle, and the main body apparatus 2 outputs a game image and the like to a stationary monitor or the like via the cradle. Here, it is assumed that a right-handed player plays the game with the right controller 4 held by the right hand. The left controller 3 is not used in the exemplary embodiment. However, for example, if the player is left-handed, the processing as described below may be performed using the left controller 3 instead of the right controller 4.

[Assumed Game]

The game assumed in the exemplary embodiment is a tennis game for players to compete in a virtual three-dimensional space. In the exemplary embodiment, as an example, a case of competing against a CPU character in a singles match will be described. As a matter of course, a player-versus-player mode in which another player operates an opponent is also applicable. In a case of the player-versus-player mode, two players may perform competitive play using one game apparatus, or may perform communication competition play by connecting two game apparatuses via a network. Instead of a singles match, a doubles match may be performed.

FIG. 8 shows an example of a game image of the tennis game according to the exemplary embodiment. The game image shown in FIG. 8 is an image obtained by a virtual camera imaging a three-dimensional virtual space (virtual tennis court). In the game image (in virtual tennis court), two athlete characters are displayed. On the near-side court (own-side court) of the virtual tennis court, a player character object (hereinafter, referred to as player character) 201 which is a player's operation target is placed. On the far-side court (opponent-side court) over the net, an athlete character (hereinafter, referred to as opponent character) 202 which is an opponent is placed. Each athlete character holds a tennis racket object (hereinafter, simply referred to as racket) with the right hand. Besides, in the game image, a tennis ball object (hereinafter, simply referred to as ball) 203 which is a moving object is also displayed.

Basic specifications and operation method of the tennis game according to the exemplary embodiment will be described. First, in this tennis game, the player swings the right controller 4 resembling a racket, whereby the player can cause the player character 201 to swing the racket in a direction corresponding to the swing direction. Hereinafter, a motion of the player character 201 swinging the racket is referred to as racket swing motion. In this tennis game, movement of the player character 201 is automatically controlled. That is, in accordance with the movement trajectory (movement direction) of the ball 203, the player character 201 automatically moves in the own-side court toward such a position where the player character 201 can hit the ball 203 back (hereinafter, such movement is referred to as automatic movement). Therefore, in this game, the player only has to concentrate on an operation of swinging the right controller 4 in accordance with a timing when the ball 203 has come, without considering a movement operation. For example, when the player character 201 is located on the left side in the own-side court, if the ball 203 moves toward the right side in the own-side court, such a position that the player character 201 can hit the ball 203 back (e.g., a given position on the left side of the trajectory of the ball 203) is calculated and the player character 201 is controlled to perform automatic movement toward the calculated position. For calculating the position of the automatic movement destination, parameters such as the movement speed set for the player character 201, the movement direction and/or the movement speed of the ball 203, and the position of the player character 201 at the time when the ball 203 starts to move, may be used. In calculating the position of the automatic movement destination of the player character 201, regarding which side of the left and right sides of the trajectory of the ball 203 is to be designated as the automatic movement destination, calculation may be performed such that a position near the center on the X axis of the own-side court preferentially becomes the position of the automatic movement destination. For example, in a case where the position of the player character 201 at the time when the ball 203 starts to move is near the right end of the own-side court and the ball 203 moves through a trajectory passing the left side of the present position of the player character 201, a given position on the left side of the trajectory of the ball 203 may be calculated as the position of the automatic movement destination. Thus, the position of the player character 201 can be controlled so that the player character 201 is located as close to the court center as possible. In a case where there is not enough time to move to a position on the court center side with respect to the movement trajectory of the ball 203, as an alternative, a position on the court end side with respect to the movement trajectory of the ball 203 may be calculated as the position of the automatic movement destination.

In the exemplary embodiment, the left controller 3 or the right controller 4 (hereinafter, referred to as controller) transmits operation data including an output of the inertial sensor to the main body apparatus 2 by the aforementioned method. Then, if the operation data satisfies a condition regarding a swing operation, it is determined that a swing operation has been performed on the controller. The condition regarding a swing operation may be set as appropriate. For example, in the exemplary embodiment, if, in the operation data, the magnitude of the acceleration on a predetermined axis of the inertial sensor exceeds a threshold, it may be determined that a swing operation has been performed on the controller. Then, if it is determined that a swing operation has been performed on the controller, the main body apparatus 2 performs processing of determining in which direction the controller has been swung in the real space, on the basis of the operation data acquired from the controller. For example, in a case where the operation data indicates that the controller has made such a motion of rotating so as to face leftward in the real space with the Z-axis direction of the controller (or inertial sensor) as a rotation axis, it is determined that a swing operation toward a "leftward direction" has been performed. Similarly, in a case where the operation data indicates that the controller has made a motion of rotating so as to face rightward in the real space, it is determined that a swing operation toward a "rightward direction" has been performed. In another exemplary embodiment, it may be determined that a swing operation toward a different direction such as an "upward direction" or a "downward direction" has been performed in accordance with the operation data acquired from the controller. The processing regarding the determination of the swing direction of the controller described here is merely an example, and may be performed in another manner.

Here, in the exemplary embodiment, regarding the direction (hereinafter, swing direction) in which the controller is swung against the ball 203 hit by the opponent character 202, a "correct-answer direction" is determined in accordance with the positional relationship between the ball 203 and the player character 201. The "correct-answer direction" is a swing direction in which the ball 203 can be hit back. In the exemplary embodiment, it is assumed that the correct-answer direction is determined between two options, i.e., either the "leftward direction" or the "rightward direction", as an example. In the following description, a direction that is not the correct-answer direction is referred to as "incorrect-answer direction". Which of the above two swing directions is the correct-answer direction is determined in accordance with the positional relationship between the ball 203 and the player character 201. Specifically, in a case where the ball 203 flying toward the own-side court is moving toward the right side as seen from the position of the automatic movement destination of the player character 201, a direction (swing direction including a leftward vector) in which the racket (controller) is swung toward the leftward direction is the correct-answer direction, and the other directions (swing directions including a rightward vector) are regarded as incorrect-answer directions. Conversely, in a case where the ball 203 is moving toward the left side as seen from the position of the automatic movement destination of the player character 201, the direction (swing direction including a rightward vector) in which the racket (controller) is swung toward the rightward direction is the correct-answer direction. In other words, where a line extending along the x-axis direction and centered at the position of the automatic movement destination is defined, under the assumption that the ball 203 passes over this line, the correct-answer direction is determined in accordance with on which of the right and left sides the passing position of the ball 203 (the intersection of the line and the movement trajectory of the ball 203) is located as seen from the position of the automatic movement destination.

Figure 9:
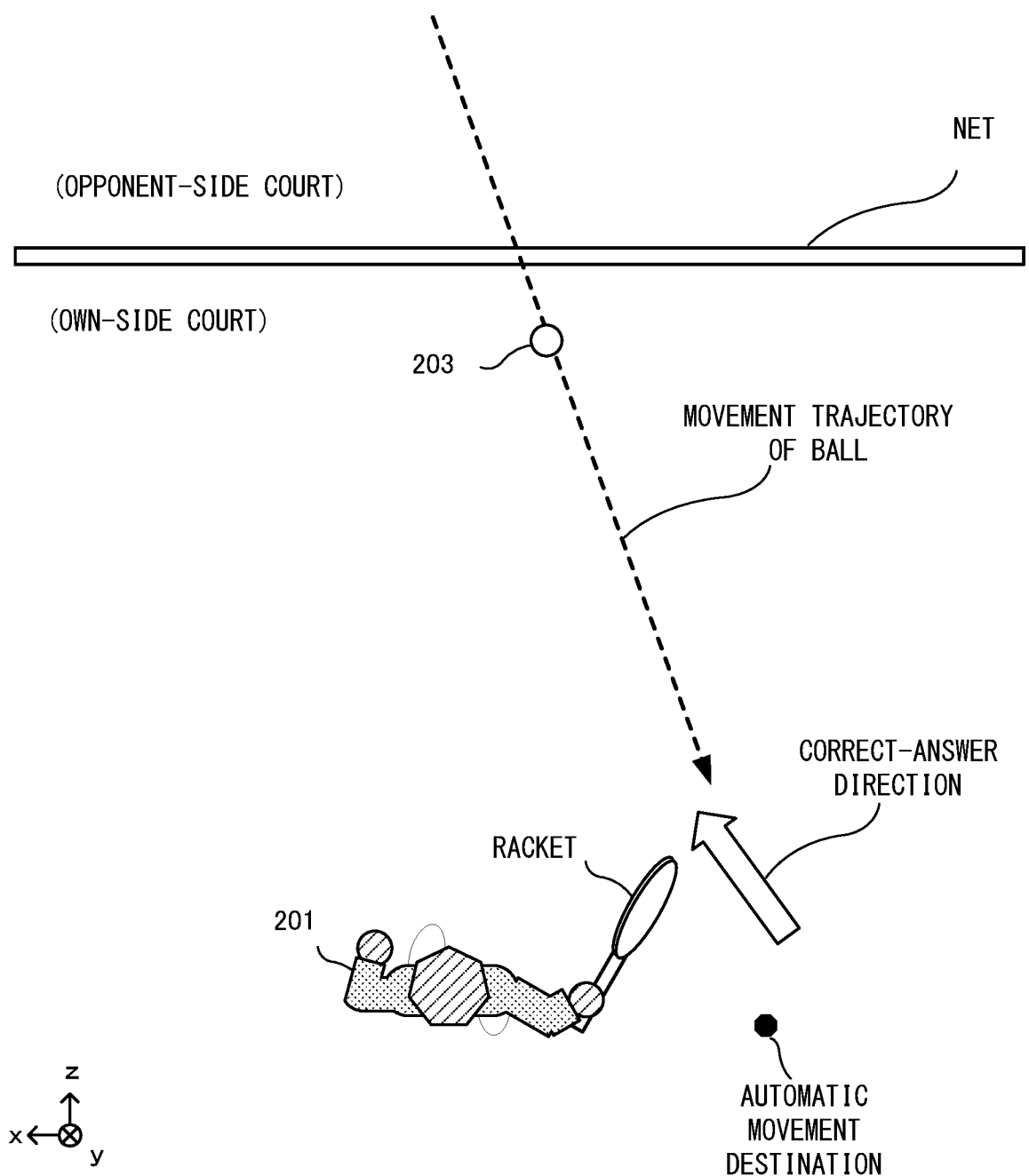
FIG. 9 is a schematic view of a non-limiting example of a virtual space in which a player character 201 is present, as seen from above.
Figure 10:
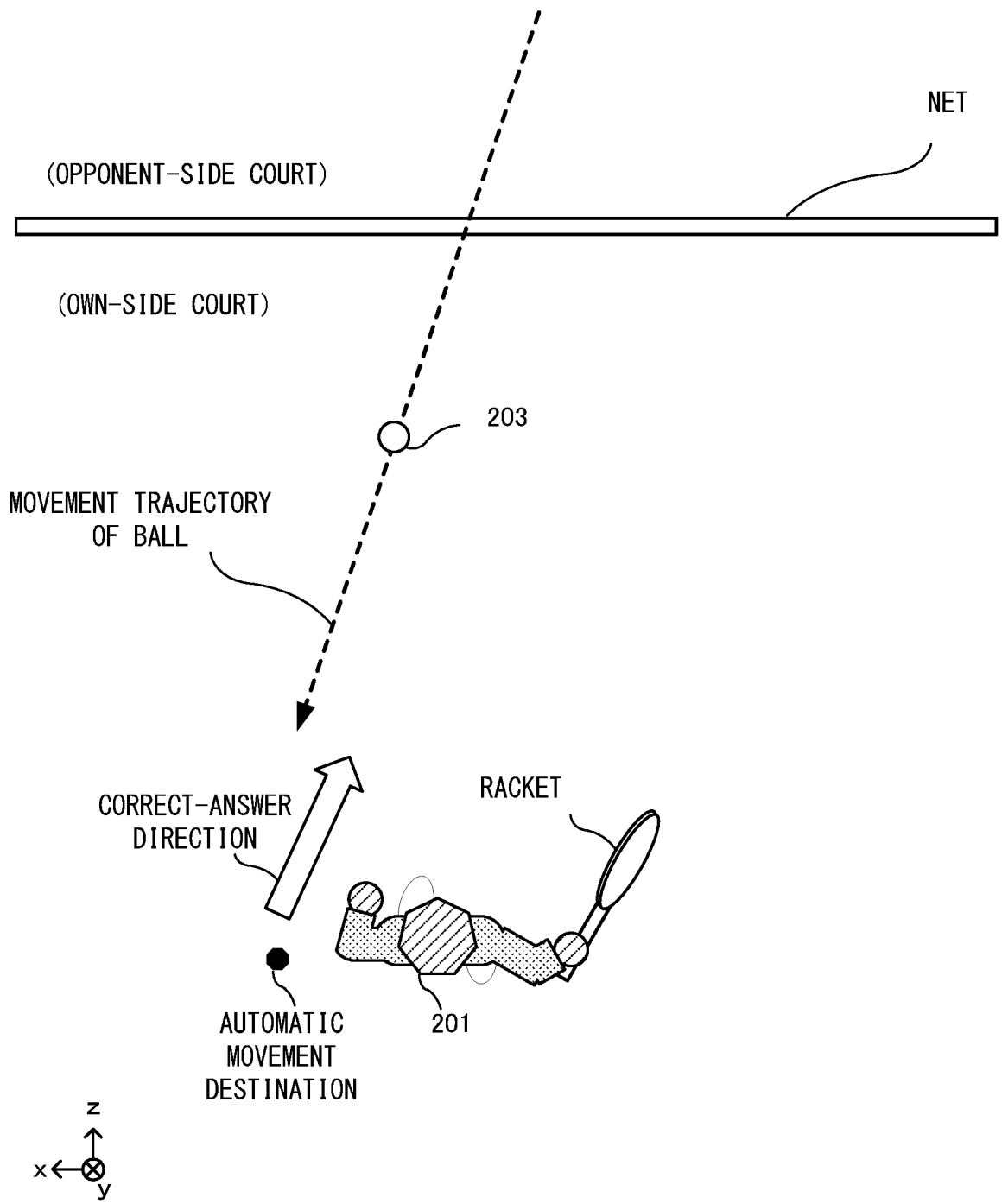
FIG. 10 is a schematic view of a non-limiting example of a virtual space in which the player character 201 is present, as seen from above.

FIG. 9 and FIG. 10 show examples of the correct-answer directions. FIG. 9 is a schematic view of the three-dimensional virtual space as seen from above, and shows the positional relationship between the ball 203 and the player character 201. In FIG. 9, the ball 203 is flying toward the right side of the position of the automatic movement destination of the player character 201. In this case, the direction of a swing action to be performed as the "correct-answer direction" by the player is the "leftward direction". This corresponds to such a swing as to hit a ball by so-called forehand in tennis. In a case where it is determined that a swing operation has been performed on the controller, as described above, in which direction the controller has been swung in the real space is determined, thereby determining whether or not a swing operation toward the "correct-answer direction" has been performed. In the case of FIG. 9, in the determination processing for the swing direction of the controller, if it is determined that a swing operation toward the "leftward direction" has been performed, it is determined that a swing operation toward the "correct-answer direction" has been performed. On the other hand, in the case where the direction of a swing action to be performed as the "correct-answer direction" by the player is the "leftward direction", in the determination processing for the swing direction of the controller, if it is determined that a swing operation toward the "rightward direction" has been performed, it is determined that a swing operation toward the "incorrect-answer direction" different from the "correct-answer direction" has been performed.

Conversely, as shown in FIG. 10, in a case where the ball 203 is flying toward the left side of the position of the automatic movement destination of the player character 201, the "rightward direction" is the "correct-answer direction". In this case, if it is determined that the controller has been swung toward the "rightward direction", it is determined that a swing operation toward the "correct-answer direction" has been performed. In this case, the player needs to perform a swing action of swinging the controller from left to right. This corresponds to such a swing as to hit a ball by backhand in tennis. On the other hand, in the case where the "rightward direction" is the "correct-answer direction", in the determination processing for the swing direction of the controller, if it is determined that a swing operation toward the "leftward direction" has been performed, it is determined that a swing operation toward the "incorrect-answer direction" has been performed.

Therefore, in actual game play, first, the player needs to determine whether the correct-answer direction is rightward or leftward by watching whether the ball 203 will come to the right side or the left side of the position of the automatic movement destination of the player character 201. Further, the player needs to perform a swing operation toward the correct-answer direction (rightward swing or leftward swing) at an appropriate timing (such a timing that the racket can hit the ball 203). Then, if the player swings the controller toward the correct-answer direction, the player character 201 makes a racket swing motion in accordance with the correct-answer direction. At this time, if the swing has been performed at an appropriate timing, the racket consequently collides with the ball 203 and thus can hit the ball 203 back. In the following description, hitting the ball 203 by the racket colliding with the ball 203 is referred to as "shot".

Figure 11:
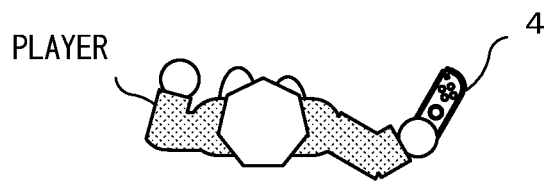
FIG. 11 illustrates a non-limiting example of how to swing a controller.
Figure 12:
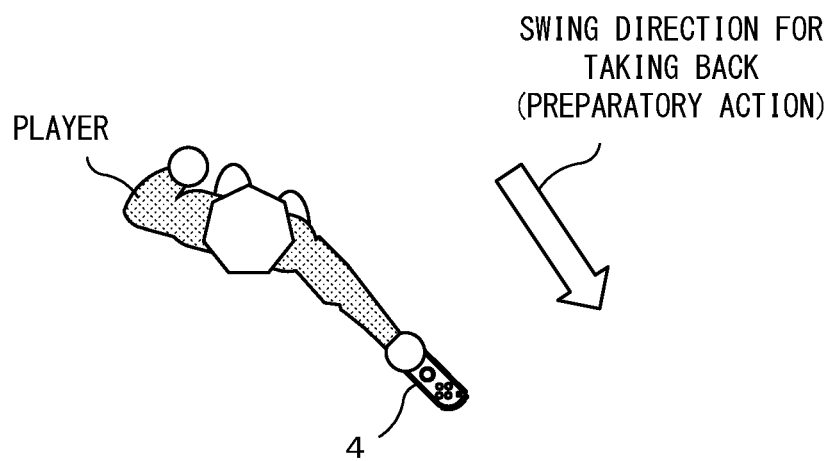
FIG. 12 illustrates a non-limiting example of how to swing the controller.
Figure 13:
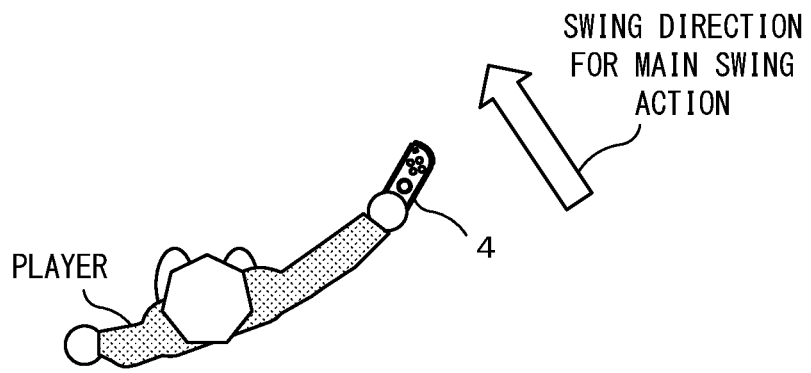
FIG. 13 illustrates a non-limiting example of how to swing the controller.

Next, the outline and the principle of processing in the exemplary embodiment will be described. The processing described below is made in view of the following problem. First, a motion of the right arm of the player when the player swings the right controller 4 to hit the ball 203 back is considered. For example, it is assumed that the ball 203 is flying toward the right side of the position of the automatic movement destination of the player character 201 as shown in FIG. 9. In this case, it is assumed that the posture of the player before performing the hit back operation is as shown in FIG. 11, as seen from above. FIG. 11 shows the state of the player holding the right controller 4 with the right hand. From this state, if the player is to hit the ball back with the right controller 4 resembling the racket, the motion of the right arm of the player is assumed to be a motion as shown in FIG. 12 and FIG. 13. That is, it is assumed that, as shown in FIG. 12, the player performs a take-back action of taking the right controller 4 backward of the player (hereinafter, referred to as preparatory action), and then, as shown in FIG.

13, the player performs an action of swinging the right controller 4 frontward of the player (hereinafter, referred to as main swing action). In this case, focusing on the swing direction according to a series of actions for hitting back, it can be said that, as shown in FIG. 12, a swing action toward a direction including a rightward component occurs as the preparatory action, and then, as shown in FIG. 13, a swing action toward a direction including a leftward component occurs as the main swing action. That is, it is considered that a swing action including a forward direction component of the movement direction of the ball 203 is performed as the preparatory action before a swing action including a reverse direction component of the movement direction of the ball 203 is performed as the main swing action. When such a series of swing actions is performed, in the game processing, there is a possibility that the swing direction of the preparatory action as shown in FIG. 12 is erroneously recognized as a swing operation that is a base of the racket swing motion, i.e., as the main swing action. That is, even though the player has merely intended to take back the right controller 4 as the preparatory action, at this time, it might be determined that the player has swung the right controller 4 in the incorrect-answer direction as an operation of swinging the racket, and this swing might be consequently regarded as a missed shot. For example, in a situation as shown in FIG. 9, there is a concern that, at the timing when the player makes a motion of the preparatory action with the intention to hit back by forehand, the player character 201 might make a motion of swinging the racket by backhand (against the player's will).

In view of the above circumstances, in the exemplary embodiment, the following processing is performed in relation to the swing operation determination. First, when a swing operation is detected, whether or not the swing direction thereof is the correct-answer direction is determined through the processing as described above on the basis of the positional relationship between the movement trajectory of the ball 203 and the player character 201. As a result, if the swing direction is not the correct-answer direction, execution of a racket swing motion is suspended once, though the swing operation is detected. Then, a predetermined period (hereinafter, referred to as suspension period) is provided, and if a swing operation toward the correct-answer direction is newly detected during the period, this swing operation is used as a swing operation that is a base of the racket swing motion. Namely, with the suspension period, the player is given an opportunity for redetermination of a swing operation toward the correct-answer direction. Then, if a swing operation toward the correct-answer direction is detected during the suspension period, the player character 201 is caused to make a racket swing motion (first action) toward the correct-answer direction. On the other hand, if a swing operation toward the correct-answer direction is not detected even during the suspension period, the player character 201 is caused to make a racket swing motion (second action) toward the incorrect-answer direction. Thus, even if the player performs a swing operation for the preparatory action as described above, this can be prevented from being immediately reflected in the racket swing motion of the player character 201 (erroneous detection prevention). Then, if a swing operation for the main swing action is detected thereafter, this can be reflected in the racket swing motion. Thus, a swing operation not intended by the player is prevented from being erroneously detected, whereby a tennis game in which the intention of the swing operation by the player can be more accurately reflected can be provided.

In the exemplary embodiment, the suspension period is set at 4 frames, where 1 frame is 1/60 second (60 fps). If the suspension period is too long, a time lag between the timing of the player performing a main swing action and when the player character 201 starts a racket swing motion becomes too long, and this might give a feeling of strangeness to the player. Meanwhile, if the suspension period is too short, the possibility of erroneous detection as described above increases. In view of the balance therebetween, it is considered that setting the suspension period at about 4 frames can prevent erroneous detection without giving a feeling of strangeness to the player. In another exemplary embodiment, the length of the suspension period may be adjusted as appropriate in accordance with the game content or the frame rate.

[Details of Tennis Game Processing in Exemplary Embodiment]

Next, with reference to FIG. 14 to FIG. 19, the tennis game processing in the exemplary embodiment will be described in more detail.

[Used Data]

Figure 14:
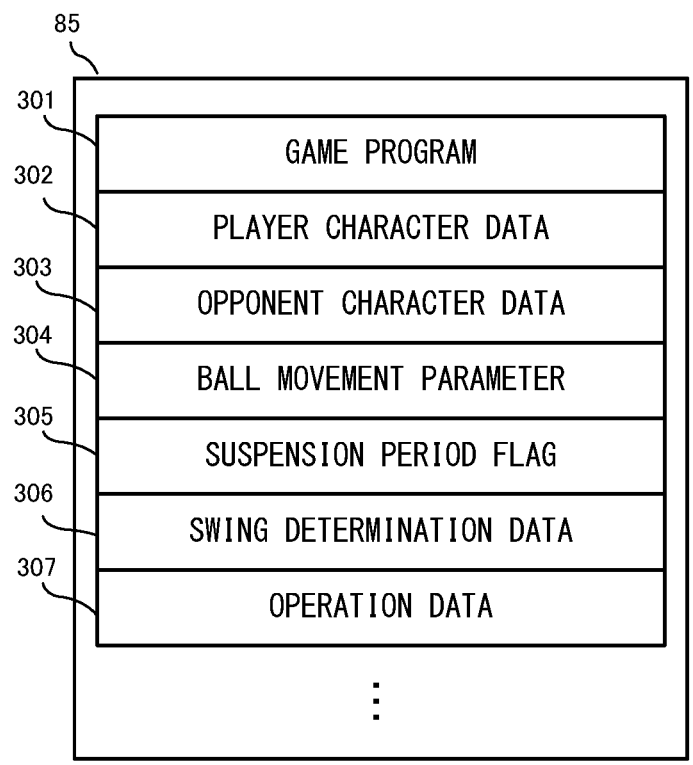
FIG. 14 is a memory map showing a non-limiting example of various data stored in a DRAM 85.

First, various data used in this tennis game processing will be described. FIG. 14 is a memory map showing an example of various data stored in the DRAM 85 of the main body apparatus 2. The DRAM 85 of the main body apparatus 2 stores a game program 301, player character data 302, opponent character data 303, a ball movement parameter 304, a suspension period flag 305, swing determination data 306, operation data 307, and the like.

The game program 301 is a program for executing the tennis game processing in the exemplary embodiment.

The player character data 302 is data regarding the player character 201. The player character data 302 includes modeling data for a three-dimensional model of the player character 201, motion data for reproducing a racket swing motion, and various data for controlling the aforementioned automatic movement (e.g., the present position, the position of the automatic movement destination, and the like). Regarding the racket swing motion, in the exemplary embodiment, racket swing motions corresponding to a plurality of swing directions are defined in advance and stored as the motion data. Then, in the game processing, the motion data corresponding to the swing direction is read as appropriate and processing of reproducing that motion is performed.

The opponent character data 303 is data regarding the opponent character 202. In the opponent character data 303, contents similar to those in the player character data 302 are stored.

The ball movement parameter 304 is data for performing movement control of the ball 203. The ball movement parameter 304 includes various parameters indicating the movement trajectory and the movement speed of a ball, for example.

The suspension period flag 305 is a flag indicating whether or not the suspension period is ongoing at the present, in the game processing. If the suspension period is ongoing, the suspension period flag 305 is set at ON. The suspension period flag 305 is initially set at OFF.

The swing determination data 306 is data for determining whether or not a swing operation has been performed, and is data indicating a content relevant to the swing operation. Specifically, the swing determination data 306 is a buffer capable of storing acceleration data and/or angular velocity data obtained from the aforementioned inertial sensors over a predetermined period (e.g., several tens of frames). In the exemplary embodiment, using the swing determination data 306, a swing operation as described above is detected and with what motion the swing operation has been performed is determined.

Figure 15:
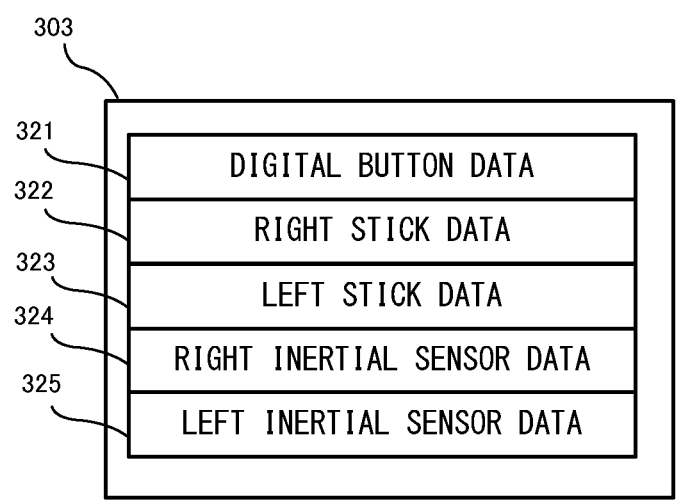
FIG. 15 shows a non-limiting example of operation data 307.

The operation data 307 is data obtained from the controller, and is data indicating the operation content of the user. FIG. 15 shows an example of the data structure of the operation data 307. The operation data 307 includes at least digital button data 321, right stick data 322, left stick data 323, right inertial sensor data 324, and left inertial sensor data 325. The digital button data 321 is data indicating press states of various buttons provided to the controller. The right stick data 322 is data indicating the content of operation to the right stick 52. Specifically, the right stick data 322 includes two-dimensional data of x and y. The left stick data 323 is data indicating the content of operation to the left stick 32. The right inertial sensor data 324 is data indicating detection results of inertial sensors such as the acceleration sensor 114 and the angular velocity sensor 115 of the right controller 4. Specifically, the right inertial sensor data 324 includes acceleration data for three axes and angular velocity data for three axes. The left inertial sensor data 325 is data indicating detection results of inertial sensors such as the acceleration sensor 104 and the angular velocity sensor 105 of the left controller 3.

Besides, various data necessary for the game processing are also generated as appropriate and stored in the DRAM 85.

[Details of Processing Executed by Processor 81]

Next, the details of the tennis game processing in the exemplary embodiment will be described. Here, processing for one play from when a service is started to when one point (minimum unit score) is gained will be described, while description for the other game processing is omitted (in the whole tennis game, this processing for one play is repeated until the end of the match). Flowcharts shown below are merely examples of the processing procedure. Therefore, as long as the same result is obtained, the order of the processing steps may be changed. In addition, the values of variables and thresholds used in determination steps are also merely examples, and other values may be used as necessary.

[Control of Opponent Character]

Figure 16:
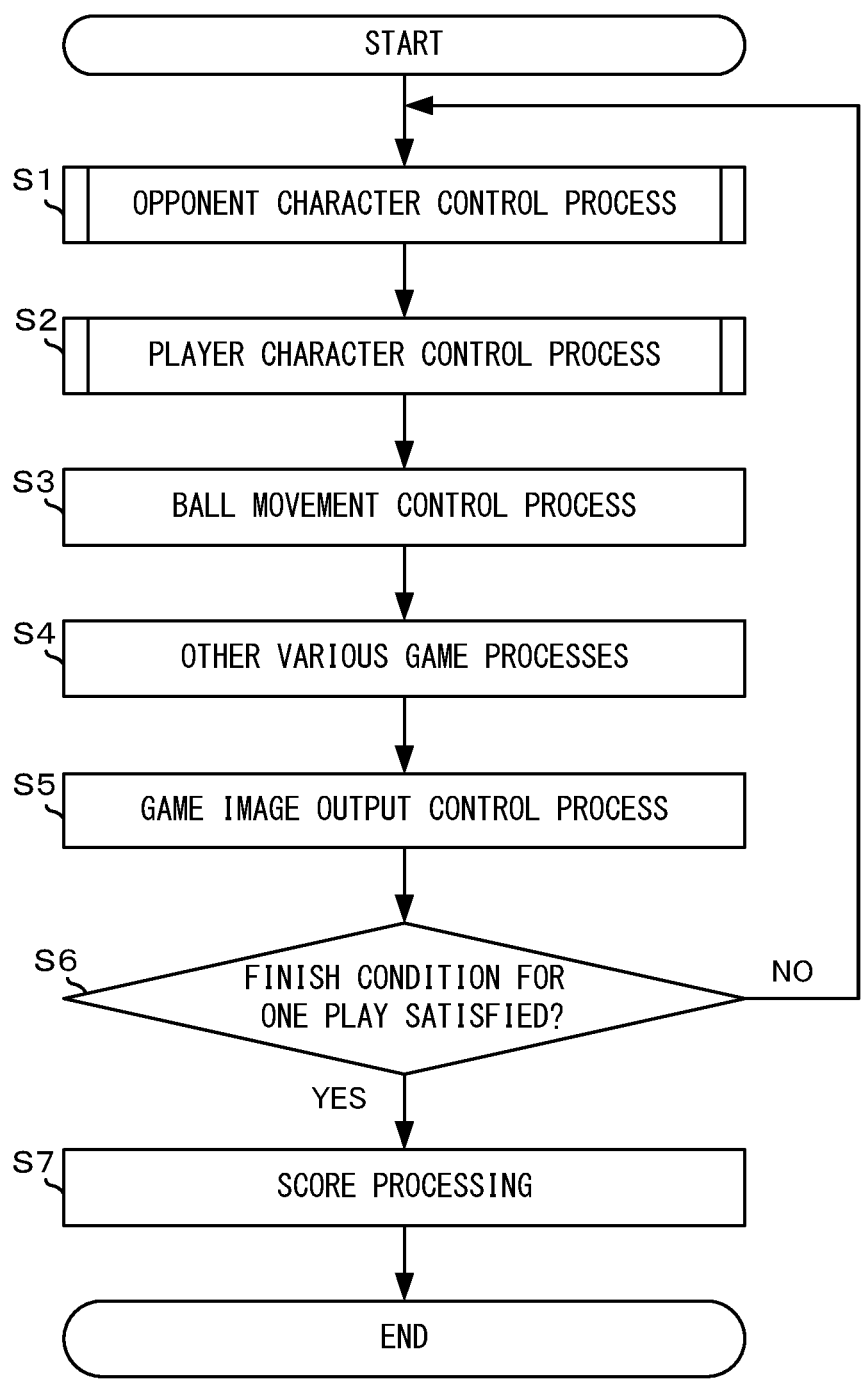
FIG. 16 is a non-limiting example of a flowchart showing the details of tennis game processing according to the exemplary embodiment.
Figure 17:
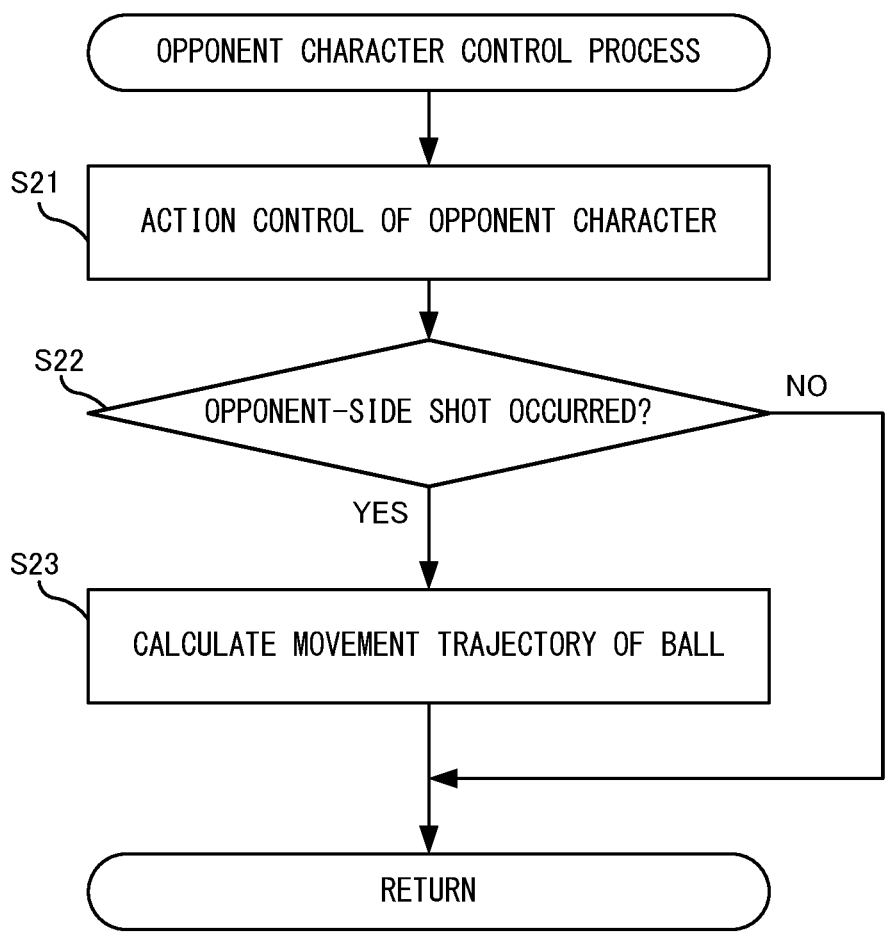
FIG. 17 is a non-limiting example of a flowchart showing the details of an opponent character control process.

FIG. 16 is a flowchart showing the details of the tennis game processing (for one play) according to the exemplary embodiment. When the play is started, first, in step S1, the processor 81 executes an opponent character control process. FIG. 17 is a flowchart showing the details of the opponent character control process. First, in step S21, the processor 81 performs action control of the opponent character 202. In the exemplary embodiment, competition against a CPU character is assumed as an example and therefore AI control is performed. Specifically, for the opponent character 202, control of automatic movement, execution control of a racket swing motion, and the like are performed.

Next, in step S22, the processor 81 determines whether or not a shot by the opponent character 202 has occurred. As a result of the determination, if the opponent's shot has occurred (YES in step S22), in step S23, the processor 81 calculates a movement trajectory and a movement speed of the ball 203 on the basis of the content of the shot, and sets them for the ball movement parameter 304. Here, the calculated movement trajectory of the ball 203 is such a trajectory that the ball 203 moves toward the player-side court. In addition, from the movement trajectory, the correct-answer direction is also derived. Therefore, the calculation for the ball movement parameter 304 accompanying the shot by the opponent character 202 can also be said as processing of determining (setting) the correct-answer direction and the incorrect-answer direction. On the other hand, as a result of the determination, if the shot has not occurred (NO in step S22), the processing in step S23 is skipped. Thus, the opponent character control process is ended.

[Control of Player Character]

Returning to FIG. 16, next, in step S2, the processor 81 executes a player character control process. This processing is for controlling an action of the player character 201.

Figure 18:
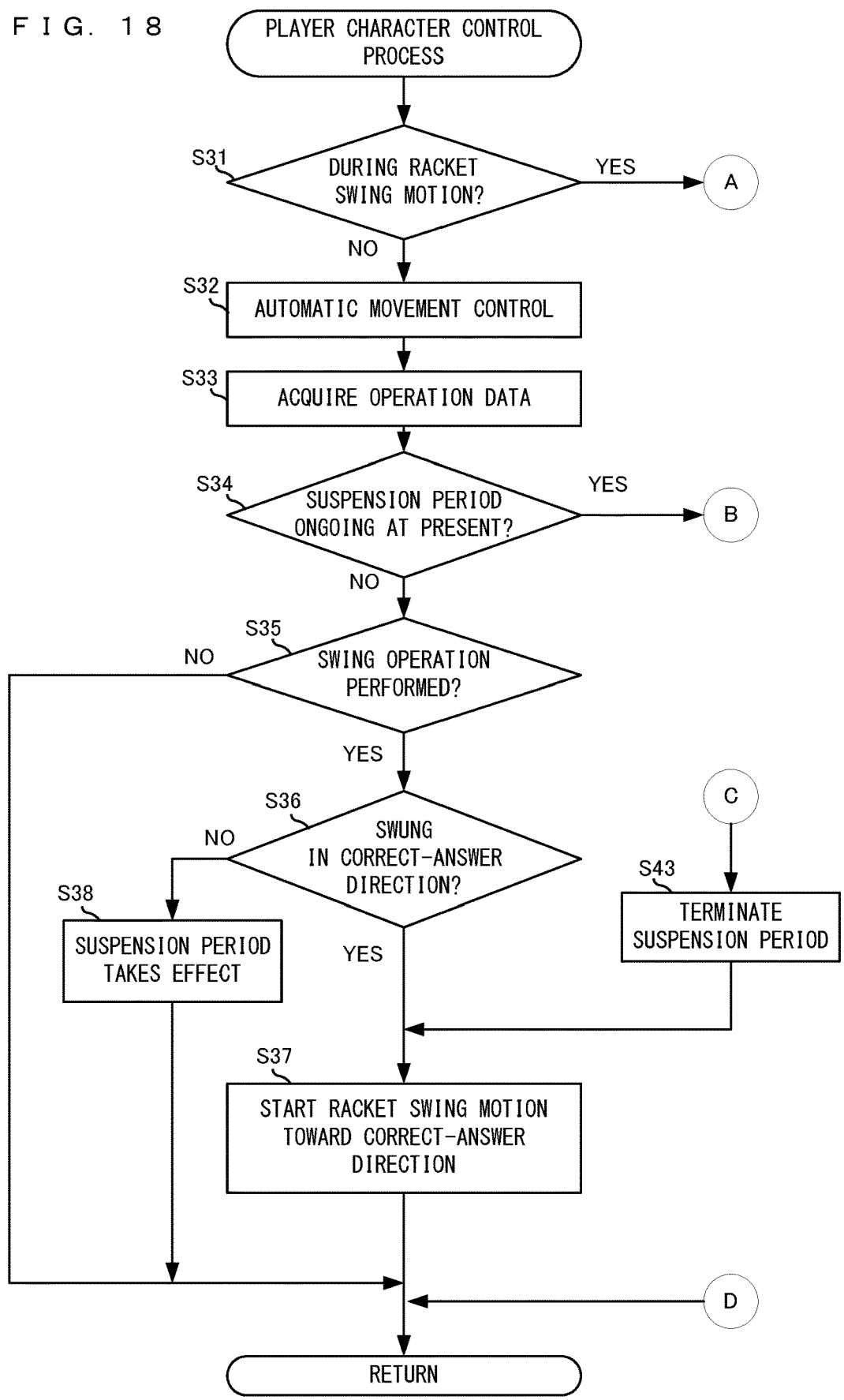
FIG. 18 is a non-limiting example of a flowchart showing the details of a player character control process.
Figure 19:
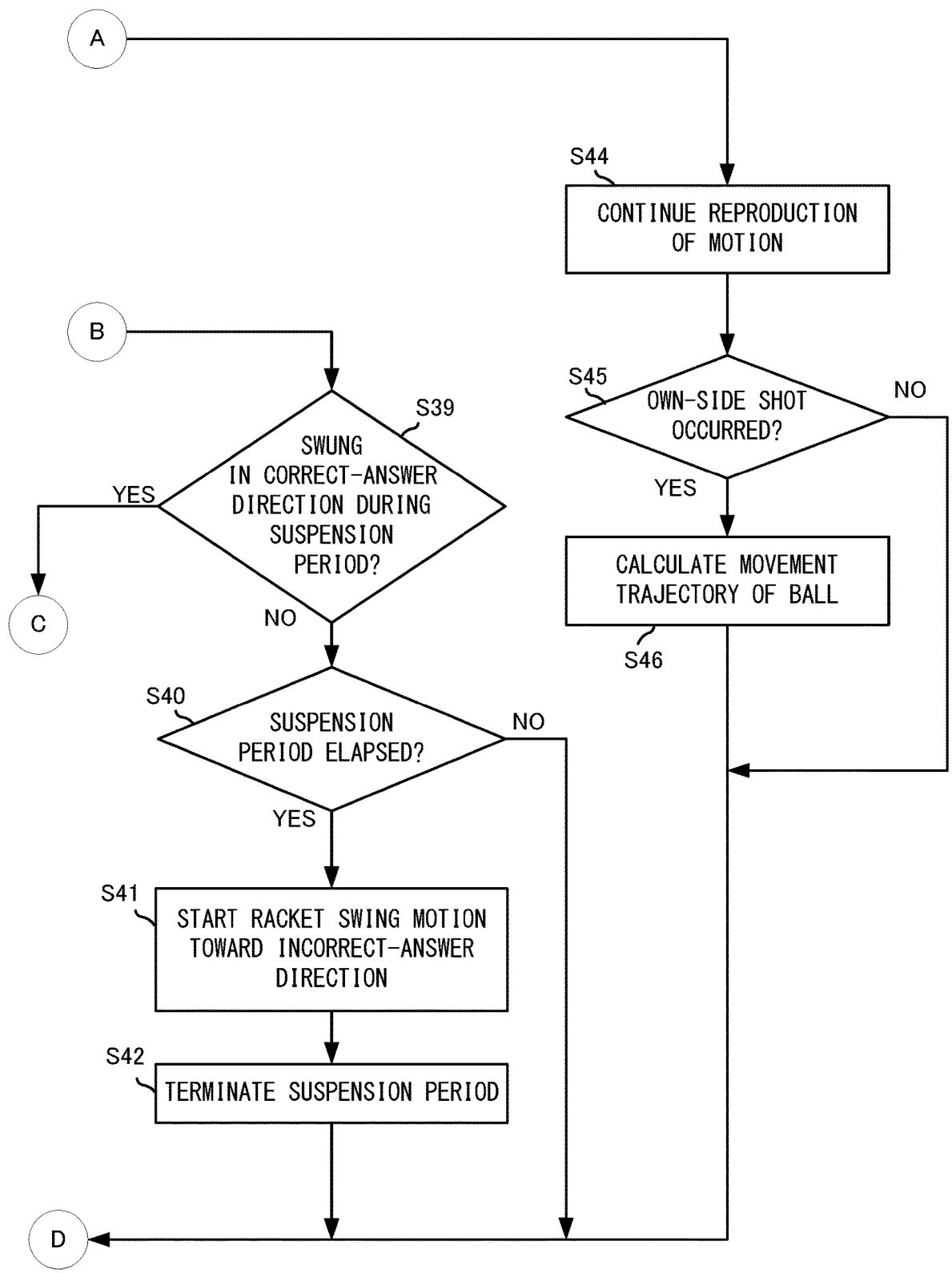
FIG. 19 is a non-limiting example of a flowchart showing the details of the player character control process.

FIG. 18 and FIG. 19 are flowcharts showing the details of the player character control process. First, in step S31, the processor 81 determines whether or not a racket swing motion in either the correct-answer direction or the incorrect-answer direction is being reproduced at the present. As a result of the determination, if the racket swing motion is not being reproduced (NO in step S31), next, in step S32, the processor 81 performs automatic movement control for the player character 201. Specifically, the processor 81 calculates the movement destination of the ball on the basis of the ball movement parameter 304, and further calculates such a position where the ball 203 can be hit back, as the position of the automatic movement destination. Then, the processor 81 moves the player character 201 toward the position of the automatic movement destination.

Next, in step S33, the processor 81 acquires the operation data 307.

Next, in step S34, the processor 81 determines whether or not the suspension period is ongoing at the present, on the basis of the suspension period flag 305. As a result of the determination, if the suspension period is not ongoing (NO in step S34), next, in step S35, the processor 81 determines whether or not a swing operation has been performed, on the basis of the swing determination data 306. The detection method for a swing operation may be any method. For example, the processor 81 may determine that a swing is started when change in the acceleration indicated by the acceleration data included in the operation data 307 has become a first threshold or more. Further, after having determined that the swing is started, the processor 81 may determine that the swing is finished when the magnitude of the acceleration indicated by the acceleration data has reached a peak and then the magnitude of the acceleration has decreased to a certain extent. Then, with the fact that the swing is finished, the processor 81 may determine that a swing operation has been performed. Alternatively, for example, the processor 81 may determine that a swing operation has been performed at the time when the swing is started.

As a result of the determination, if a swing operation has been performed (YES in step S35), in step S36, the processor 81 determines whether or not the swing operation has been performed toward the correct-answer direction. Specifically, on the basis of the swing determination data 306, the processor 81 determines orientation change of the right controller 4 or the like over the past several frames, and on the basis of this, calculates the swing direction. Further, the processor 81 determines the correct-answer direction as described above on the basis of the positional relationship between the ball 203 and the player character 201. Then, the processor 81 compares both directions, to determine whether or not the swing operation has been performed toward the correct-answer direction. As described above, in the exemplary embodiment, whether or not the swing is toward the correct-answer direction is determined focusing on the x-axis component. For example, the processor 81 calculates the swing direction as a three-axis vector, and confirms whether the x-axis vector component is rightward or leftward, to determine whether or not the swing is toward the correct-answer direction.

As a result of the determination, if the swing operation has been performed toward the correct-answer direction (YES in step S36), in step S37, the processor 81 starts a racket swing motion of the player character 201 in accordance with the correct-answer direction. Specifically, the processor 81 reads motion data defined in advance in accordance with the swing direction regarded as the correct-answer direction at this time, from the player character data 302. Then, the processor 81 performs control for causing the player character 201 to start a motion defined by the motion data. In another exemplary embodiment, for the racket swing motion, the content of the motion may be dynamically determined in accordance with the content of the swing operation, instead of using the motion data defined in advance. For example, a motion to be performed by the player character 201 may be calculated in accordance with the content of the swing operation (orientation change in the right controller 4), and may be temporarily stored as the motion data in the DRAM 85. In still another exemplary embodiment, for example, in a case where determination that a swing operation has been performed is made at the time when it is determined that a swing is started as described above, control may be performed so as to change the posture of the player character 201 (orientations of right arm and racket) in real time in accordance with the orientation of the right controller 4 for every frame during a period in which it is determined that the swing is being performed.

On the other hand, as a result of the determination, if the swing operation is not toward the correct-answer direction (NO in step S36), in step S38, the processor 81 sets the suspension period flag 305 to ON. That is, the suspension period takes effect. Then, the player character control process is ended.

On the other hand, as a result of the determination in step S35, if a swing operation has not been performed (NO in step S35), the player character control process is ended.

Next, processing in a case where it is determined that the suspension period is ongoing at the present as a result of the determination in step S34 will be described (YES in step S34). In this case, first, in step S39 in FIG. 19, the processor 81 determines whether or not a swing operation toward the correct-answer direction has been performed during the suspension period. The determination method for the swing direction is the same as the above method. As a result of the determination, if a swing operation toward the correct-answer direction has not been performed (NO in step S39), in step S40, the processor 81 determines whether or not the suspension period has elapsed. As a result, if the suspension period has not elapsed yet (NO in step S40), the processor 81 ends the player character control process. On the other hand, if the suspension period has elapsed (YES in step S40), in step S41, the processor 81 starts a racket swing motion toward the incorrect-answer direction. Next, in step S42, the processor 81 sets the suspension period flag 305 to OFF. That is, the suspension period is terminated. Then, the processor 81 ends the player character control process.

On the other hand, as a result of the determination in step S39, if a swing operation toward the correct-answer direction has been performed during the suspension period (YES in step S39), in step S43 in FIG. 18, the processor 81 sets the suspension period flag to OFF. That is, even if the suspension period remains (has not elapsed) at this time, the suspension period is terminated. Then, the process proceeds to step S37, to start a racket swing motion in accordance with the correct-answer direction.

Next, processing in a case where it is determined that a racket swing motion toward the correct-answer direction or the incorrect-answer direction is being performed as a result of the determination in step S31, will be described. In this case, in step S44 in FIG. 19, the processor 81 continues reproduction of the racket swing motion that is being reproduced at the present. That is, processing of moving the racket is executed.

Next, in step S45, the processor 81 determines whether or not a shot by the player character 201 has occurred. That is, whether or not collision between the racket of the player character 201 and the ball 203 has occurred, is determined. The shot occurs only when the racket swing motion is made at an appropriate timing. The appropriate timing is a timing at which the positional relationship between the player character 201 and the ball 203 is such a positional relationship that the ball 203 has come to a position where the racket can reach the ball 203. Therefore, if the right controller 4 is swung toward the correct-answer direction at an inappropriate timing, the racket does not collide with the ball 203, ending up air swing, though a racket swing motion toward the correct-answer direction is made. In addition, if a racket swing motion toward the incorrect-answer direction has been performed, basically, the racket and the ball 203 do not collide with each other, and thus no shot occurs. That is, performing a racket swing motion toward the incorrect-answer direction can also be said as processing for missed shot/air swing, irrespective of the swing timing. Therefore, in other words, a racket swing motion toward the correct-answer direction is processing that can cause a shot (a shot occurs as long as the motion is performed at an appropriate timing), and thus can also be said as processing advantageous to the player as compared to the racket swing motion toward the incorrect-answer direction which never causes a shot. In another exemplary embodiment, even when a swing operation toward the incorrect-answer direction has been performed, if the swing operation has been performed at an appropriate timing, processing of causing the ball 203 and the racket to collide with each other and causing a shot may be executed. In this way, even when a beginner plays the game, the game can be easily advanced. In this case, the movement direction of the ball, the movement speed thereof, or the like may be adjusted so that the opponent has an advantage in the game.

As a result of the determination, if a shot has occurred by the player character 201 (YES in step S45), in step S46, the processor 81 calculates the movement trajectory and the movement speed of the ball 203 and the like on the basis of the content of the swing operation that can be calculated from the swing determination data 306, and sets them for the ball movement parameter 304. Specifically, the movement trajectory and the movement speed of the ball 203 are calculated on the basis of orientation change in the right controller 4 during the swing operation. At this time, for example, twist of a wrist or the like may be determined on the basis of the orientation change during the swing operation and a movement trajectory that will be made when topspin or backspin is imparted to the ball 203 may be calculated. In other words, this processing can be said as processing of determining the content of the shot such as the way of imparting rotation to the ball 203 on the basis of the content of the swing operation (orientation change) when the shot has occurred.

On the other hand, as a result of the determination, if no shot has occurred by the player character 201 (NO in step S45), the processing in step S46 is skipped. Then, the processor 81 ends the player character control process.

[Movement Control of Ball]

Returning to FIG. 16, next, in step S3, the processor 81 executes a ball movement control process. Specifically, the processor 81 moves the ball 203 on the basis of the content of the ball movement parameter 304.

[Other Various Game Processes]

Next, in step S4, the processor 81 executes other various game processes. For example, the processor 81 executes processes such as a sound control process for controlling BGM, a sound effect, and the like, as appropriate.

[Image Output Control]

Next, in step S5, the processor 81 executes processing of generating and outputting a game image. Specifically, the processor 81 takes an image of a virtual game space with the above game processes reflected therein, by the virtual camera. Further, the processor 81 generates a game image on the basis of the taken image and outputs the game image to the predetermined monitor connected to the main body apparatus 2, or the like.

[Finish Determination for One Play]

Next, in step S6, the processor 81 determines whether or not a condition for finishing one play is satisfied. For example, whether or not the ball 203 that has fallen in the court on either side has failed to be returned before bouncing twice, and the like are determined. If the finish condition is satisfied (YES in step S6), in step S7, the processor 81 performs processing of adding a point to the player or the opponent in accordance with on which court side the ball 203 has bounced twice. Then, the processor 81 ends the tennis game processing for one play. On the other hand, if the finish condition has not been satisfied yet (NO in step S6), the process returns to step S1, so that the process is repeated.

Thus, the detailed description of the tennis game processing for one play is finished.

As described above, in the exemplary embodiment, in such a tennis game, the suspension period is provided in determining swing toward the correct-answer direction. Thus, even if a swing toward the incorrect-answer direction is detected, this is not immediately adopted and an opportunity for swinging again can be given to the player. As a result, a swing operation such as the aforementioned preparatory action which is not intended by the player is prevented from being erroneously detected as the main swing action, whereby detection accuracy for a swing operation that is originally intended by the player can be enhanced. The processing in the exemplary embodiment can more effectively prevent erroneous detection regarding an operation such as swinging a racket of tennis, for example.

[Modifications]

In the above exemplary embodiment, the example in which movements of the player character 201 and the like are subjected to automatic movement control has been shown. However, in another exemplary embodiment, manual movement control may be reflected during movement based on automatic movement control. This enables fine adjustment of the movement destination or the like with respect to the movement action of the player character 201.

In the above exemplary embodiment, the example in which determination for the correct-answer direction is performed focusing on the x-axis direction (left-right direction) has been shown. In another exemplary embodiment, in view of the game content or the game balance, the determination may be performed focusing on the two axial directions of x axis and z axis (directions on xz plane) in FIG. 9 and FIG. 10, or may be performed using three-dimensional directions of three axes x, y, z, for example. In the above exemplary embodiment, because of the nature of the tennis game, a direction including the reverse direction component of the movement direction of the ball 203 is set as the correct-answer direction, but in another exemplary embodiment, a predetermined direction may be set as the correct-answer direction, in accordance with the game content or the like.

Regarding the correct-answer direction, the example in which the number of correct-answer directions is one (one of two options) has been shown in the above exemplary embodiment. However, in a case where two or more axial direction components are used in determination for the correct-answer direction, a configuration in which a plurality of directions can be determined as the correct-answer direction may be adopted.

In another exemplary embodiment, a period for recognizing a swing operation performed by the player may be limited. For example, only when the ball 203 is present within a predetermined range around the player character 201 (i.e., in such a positional relationship that the ball 203 is near the player character 201 to a certain extent), the above processes regarding the swing operation may be performed. In this case, for example, control may be performed such that, while the ball 203 is present at the opponent-side court, a swing operation is not detected even when the right controller 4 is swung.

In the above exemplary embodiment, the suspension period is set at 4 frames, as an example. The suspension period may be a static (fixed) period or may be dynamically changed in accordance with game development or the like. It is conceivable that the magnitude of the preparatory action differs among players, depending on the habit of each individual player about the way of swinging. Therefore, the suspension period may be dynamically adjusted during the game processing so as to be an optimum suspension period in accordance with the habit of each player about the way of swinging. For example, statistics on the length of the period from when the suspension period takes effect to when a swing operation toward the correct-answer direction is detected may be taken, and if a swing operation toward the correct-answer direction is often detected barely within 4 frames, the suspension period may be adjusted to be, for example, prolonged by 1 or 2 frames, as the match progresses. Further, the suspension period adjusted for each player as described above may be saved in saved data as personal data, and in the next and subsequent plays, the suspension period optimized for each player may be applied from the start of a match. In still another exemplary embodiment, the suspension period may be allowed to be manually adjusted by the player on a predetermined setting screen before the start of a match. For example, on the predetermined setting screen, the suspension period may be measured while the player is let to actually perform an operation of swinging a racket. Then, with the measurement result presented to the player, the suspension period that the player considers optimum may be set so as to be used in a match.

In the above exemplary embodiment, the tennis game is shown as an example. Besides, also for various sport games in which a racket or a similar tool is swung, the above processing is applicable. For example, sport games such as table tennis, badminton, and baseball (in particular, operation of swinging a bat) may be employed. Regarding processing for swing directions such as the correct-answer direction, an upward direction/downward direction instead of the above-described rightward direction/leftward direction may be used in accordance with the content of the game.

In the above exemplary embodiment, the case where a series of processes for the tennis game processing is executed by a single main body apparatus 2 has been described. In another exemplary embodiment, the series of processes may be executed by an information processing system including a plurality of information processing apparatuses. For example, in an information processing system including a terminal-side apparatus and a server-side apparatus capable of communicating with the terminal-side apparatus via a network, a part of the series of processes may be executed by the server-side apparatus. Further, in such an information processing system including a terminal-side apparatus and a server-side apparatus capable of communicating with the terminal-side apparatus via a network, a major process of the series of processes may be executed by the server-side apparatus, and a part of the series of processes may be executed by the terminal-side apparatus. In such an information processing system, a server-side system may be composed of a plurality of information processing apparatuses, and processing to be executed on the server side may be executed by the plurality of information processing apparatuses in a shared manner. A so-called cloud gaming configuration may be adopted. For example, the main body apparatus 2 may send operation data indicating an operation from a user to a predetermined server, various game processes may be executed in the server, and the execution result may be distributed as a video and/or sound to the main body apparatus 2 by streaming.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. An information processing system comprising:
   an input device having an inertial sensor; and
   an information processing apparatus, the information processing apparatus being configured to:
   execute a game;
   acquire operation data including at least data based on an output of the inertial sensor;
   determine, between at least a first direction and a second direction, a movement direction for the input device;
   based on determination that the input device has been moved in the first direction, execute first-type processing in the game;
   activate a suspension period based on determination that the input device has been moved in the second direction;
   while the suspension period is active and based on determination that the input device has been moved in the first direction during the suspension period, execute the first-type processing; and
   based on determination that the input device has not been moved in the first direction during the suspension period and after the suspension period has elapsed, execute second-type processing in the game.

2. The information processing system according to claim 1, the information processing apparatus being further configured to:
   based on determination that the input device has been moved in the first direction during the suspension period, execute the first-type processing before the suspension period elapses.

3. The information processing system according to claim 1, wherein
   the first-type processing in the game is processing for advancing the game so as to be more advantageous to a player who plays the game, than the second-type processing in the game.

4. The information processing system according to claim 1, the information processing apparatus being further configured to:
   execute processing relevant to a predetermined game event in the game; and
   on the basis of a content of the predetermined game event, set a first determination condition for determining that the input device has been moved in the first direction, and a second determination condition for determining that the input device has been moved in the second direction.

5. The information processing system according to claim 4, the information processing apparatus being further configured to:
   execute processing of moving a moving object in a virtual space, in the game; and
   set the first determination condition and the second determination condition on the basis of a position of a player object placed in the virtual space and a position of the moving object.

6. The information processing system according to claim 5, the information processing apparatus being further configured to:
   move the player object toward a player movement destination position calculated on the basis of a movement direction of the moving object, in the game.

7. The information processing system according to claim 6, the information processing apparatus being further configured to:
   set the first determination condition and the second determination condition on the basis of the player movement destination position calculated on the basis of the movement direction of the moving object, in the game.

8. The information processing system according to claim 5, wherein
   based on determination that the input device has been moved in the first direction, processing of causing the player object to perform a first action with respect to the moving object is executed as the first-type processing, and
   based on determination that the input device has been moved in the second direction, processing of causing the player object to perform a second action different from the first action is executed as the second-type processing.

9. The information processing system according to claim 1, wherein
   the first-type processing in the game is executed on the basis of an orientation of the input device in a determination period including at least a timing when a predetermined condition is satisfied, the orientation being calculated on the basis of the acquired operation data.

10. A computer-readable non-transitory storage medium having stored therein an information processing program to be executed by a computer of an information processing apparatus connectable to an input device having an inertial sensor, the program comprising instructions that are configured to cause the computer to:
  execute a game;
  acquire operation data including at least data based on an output of the inertial sensor, from the input device;
  determine, between at least a first direction and a second direction, a movement direction for the input device;
  based on determination that the input device has been moved in the first direction, execute first-type processing in the game; and
  activate a suspension period based on determination that the input device has been moved in the second direction;
    while the suspension period is active and based on determination that the input device has been moved in the first direction during the suspension period, execute the first-type processing; and
    based on determination that the input device has not been moved in the first direction during the suspension period and after the suspension period has elapsed, execute second-type processing in the game.

11. The computer-readable non-transitory storage medium according to claim 10, wherein the instructions are further configured to cause the computer to:
  based on determination that the input device has been moved in the first direction during the suspension period, execute the first-type processing before the suspension period elapses.

12. The computer-readable non-transitory storage medium according to claim 10, wherein the instructions are further configured to cause the computer to:
  execute processing relevant to a predetermined game event in the game; and
  on the basis of a content of the predetermined game event, set a first determination condition for determining that the input device has been moved in the first direction, and a second determination condition for determining that the input device has been moved in the second direction.

13. The computer-readable non-transitory storage medium according to claim 12, wherein the instructions are further configured to cause the computer to:
  execute processing of moving a moving object in a virtual space, in the game; and
  set the first determination condition and the second determination condition on the basis of a position of a player object placed in the virtual space and a position of the moving object.

14. An information processing apparatus comprising:
  an input device having an inertial sensor; and
  a computer that includes at least one hardware processor, the computer being configured to:
    execute a game;
    acquire operation data including at least data based on an output of the inertial sensor;
    determine, between at least a first direction and a second direction, a movement direction for the input device;
    based on determination that the input device has been moved in the first direction, execute first-type processing in the game; and
    activate a suspension period based on determination that the input device has been moved in the second direction;
      while the suspension period is active and based on determination that the input device has been moved in the first direction during the suspension period, execute the first-type processing; and
      based on determination that the input device has not been moved in the first direction during the suspension period and after the suspension period has elapsed, execute second-type processing in the game after the suspension period has elapsed.

15. The information processing apparatus according to claim 14, the computer being further configured to:
  based on determination that the input device has been moved in the first direction during the suspension period, execute the first-type processing before the suspension period elapses.

16. The information processing apparatus according to claim 14, the computer being further configured to:
  execute processing relevant to a predetermined game event in the game; and
  on the basis of a content of the predetermined game event, set a first determination condition for determining that the input device has been moved in the first direction, and a second determination condition for determining that the input device has been moved in the second direction.

17. The information processing apparatus according to claim 16, the computer being further configured to:
  execute processing of moving a moving object in a virtual space, in the game; and
  set the first determination condition and the second determination condition on the basis of a position of a player object placed in the virtual space and a position of the moving object.

18. An information processing method to be executed by a computer of an information processing apparatus connectable to an input device having an inertial sensor, the method comprising:
  executing a video game;
  acquiring operation data including at least data based on an output of the inertial sensor, from the input device;
  determining, between at least a first direction and a second direction, a movement direction for the input devices;
  based on determination that the input device has been moved in the first direction executing first-type processing in the video game; and
  activating a suspension period based on determination that the input device has been moved in the in a second direction;
    while the suspension period is active and based on determination that the input device has been moved in the first direction during the suspension period, executing the first-type processing; and
    based on determination that the input device has not been moved in the first direction during the suspension period and after the suspension period has elapsed, executing second-type processing in the video game.

19. The information processing method according to claim 18, further comprising:
  based on determination that the input device has been moved in the first direction during the suspension period, executing the first-type processing before the suspension period elapses.

20. The information processing method according to claim 18, further comprising:
  executing processing relevant to a predetermined game event in the game; and
  on the basis of a content of the predetermined game event, setting a first determination condition for determining that the input device has been moved in the first direction, and a second determination condition for determining that the input device has been moved in the second direction.

\* \* \* \* \*